(12) United States Patent
Sakakibara et al.

(10) Patent No.: US 12,407,162 B2
(45) Date of Patent: Sep. 2, 2025

(54) POWER SUPPLY CONTROL SYSTEM AND PROCESSING METHOD

(71) Applicants: AutoNetworks Technologies, Ltd., Yokkaichi (JP); Sumitomo Electric Industries, Ltd., Yokkaichi (JP); Sumitomo Wiring Systems, Ltd., Osaka (JP)

(72) Inventors: Koki Sakakibara, Yokkaichi (JP); Kota Oda, Yokkaich (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 140 days.

(21) Appl. No.: 18/555,447

(22) PCT Filed: Mar. 25, 2022

(86) PCT No.: PCT/JP2022/014244
§ 371 (c)(1),
(2) Date: Oct. 13, 2023

(87) PCT Pub. No.: WO2022/220055
PCT Pub. Date: Oct. 20, 2022

(65) Prior Publication Data
US 2024/0204507 A1 Jun. 20, 2024

(30) Foreign Application Priority Data
Apr. 15, 2021 (JP) .................................. 2021-069075

(51) Int. Cl.
H02H 7/12 (2006.01)
H02H 1/00 (2006.01)

(52) U.S. Cl.
CPC ......... *H02H 7/1213* (2013.01); *H02H 1/0007* (2013.01)

(58) Field of Classification Search
CPC .. H02H 7/1213; H02H 1/0007; H02H 1/0061; H02H 3/087; B60R 16/02; H02J 1/00
(Continued)

(56) References Cited

U.S. PATENT DOCUMENTS 7,154,240 B2 * 12/2006 Watanabe ............. H02P 29/032
318/434
8,139,333 B2 * 3/2012 Imai ...................... H01H 47/32
361/72
(Continued)

FOREIGN PATENT DOCUMENTS

| JP | 2004-201410 A | 7/2004 |
| JP | 2020-061827 A | 4/2020 |

OTHER PUBLICATIONS

International Search Report, Application No. PCT/JP2022/014244, mailed May 31, 2022. ISA/Japan Patent Office.

*Primary Examiner* — Dharti H Patel
(74) *Attorney, Agent, or Firm* — Honigman LLP

(57) ABSTRACT

A first ECU (control device) controls power supplied through a power supply switch, by turning the power supply switch on or off. A second ECU (switching device) turns a power switch on or off. In the first ECU, a processing unit executes non-power supply control processing different from processing relating to control of power supplied through the power supply switch. After a current conduction fault in which a current flows through the power supply switch despite an instruction being given to turn off the power supply switch is detected, the second ECU alternately turns the power switch on and off repeatedly.

7 Claims, 16 Drawing Sheets

(58) Field of Classification Search
USPC .......................................................... 361/93.1
See application file for complete search history.

(56) References Cited

U.S. PATENT DOCUMENTS

| | | | |
|---|---|---|---|
| 9,678,139 B2* | 6/2017 | Kisslinger da Silva ..................... G01R 19/16519 | |
| 11,770,000 B2* | 9/2023 | Haggerty ............... H02H 9/046 361/91.5 | |
| 2008/0247108 A1* | 10/2008 | Ando ................... H02H 7/0833 361/84 | |
| 2011/0110002 A1* | 5/2011 | Ooshima .................. H02P 7/29 361/33 | |
| 2012/0044607 A1* | 2/2012 | Loewe ............... H03K 17/0826 361/91.1 | |
| 2015/0116890 A1* | 4/2015 | Naruse ................... F02P 9/002 361/254 | |
| 2015/0146328 A1* | 5/2015 | Mikami ................. H02M 1/32 361/18 | |
| 2015/0311692 A1* | 10/2015 | Hiyama ................. H02M 1/08 361/31 | |
| 2018/0251084 A1 | 9/2018 | Tateishi | |
| 2019/0128965 A1 | 5/2019 | Park et al. | |
| 2021/0273439 A1 | 9/2021 | Nakaguchi et al. | |
| 2021/0384757 A1 | 12/2021 | Sawano et al. | |

* cited by examiner

Legend:
A: Transmission processing that needs to be stopped

| Faulty power supply switch | A |
|---|---|
| Power supply switch F1 | None |
| Power supply switch F2 | Transmission processing of vehicle data D1 |

FIG. 15

| Faulty power supply switch | On-period | Off-period |
|---|---|---|
| Power supply switch F1 | ... | ... |
| Power supply switch F2 | ... | ... |

POWER SUPPLY CONTROL SYSTEM AND PROCESSING METHOD

CROSS-REFERENCE TO RELATED APPLICATIONS

This application is the U.S. national stage of PCT/JP2022/014244 filed on Mar. 25, 2022, which claims priority of Japanese Patent Application No. JP 2021-069075 filed on Apr. 15, 2021, the contents of which are incorporated herein.

TECHNICAL FIELD

The present disclosure relates to a power supply control system and a processing method.

BACKGROUND

JP 2019-140747A discloses a vehicular power supply control device that controls power supply from a capacitor to a load. A power switch and a power supply switch are disposed on a current path of a current that flows from the capacitor to the load. The power switch is disposed upstream of the power supply switch. The power supply control device controls power supply by instructing to turn the power supply switch on or off while the power switch is on. If a current conduction fault occurs in which a current flows through the power supply switch despite an instruction being given to turn off the power supply switch, the power switch is turned off. Power supply thereby stops.

In the case where power is supplied to a power supply control device from a connection node between a power switch and a power supply switch, execution of all processing stops in the power supply control device, when the power switch turns off. In the case where non-power supply control processing different from processing relating to control of power supplied through the power supply switch is being executed in the power supply control device, execution of the non-power supply control processing also stops, due to the power switch turning off.

In view of this, an object is to provide a power supply control system and a processing method that are able to execute non-power supply control processing, even in the case where a current conduction fault occurs.

SUMMARY

A power supply control system according to one mode of the present disclosure includes a control device configured to control power supplied through a first switch, by turning the first switch on or off, and a switching device configured to turn on or off a second switch disposed upstream of the first switch on a current path of a current flowing through the first switch, the control device including a processing unit configured to receive power supply from a connection node between the first switch and the second switch and execute processing, the processing unit instructing to turn the first switch on or off while the second switch is on, executing non-power supply control processing different from processing relating to control of power supplied through the first switch, and determining whether a current conduction fault in which a current flows through the first switch despite an instruction being given to turn off the first switch has occurred, and the switching device alternately turning the second switch on and off repeatedly, after the processing unit determines that the current conduction fault has occurred.

A processing method according to one mode of the present disclosure is a processing method in which a first computer and a second computer that receive power supply from a connection node between a first switch and a second switch disposed upstream of the first switch on a current path of a current flowing through the first switch, the first computer executing a step of instructing to turn the first switch on or off while the second switch is on, a step of executing non-power supply control processing different from processing relating to control of power supplied through the first switch, and a step of determining whether a current conduction fault in which a current flows through the first switch despite an instruction being given to turn off the first switch has occurred, the second computer executing a step of alternately instructing repeatedly to turn the second switch on and off, after the first computer determines that the current conduction fault has occurred.

Note that the present disclosure can be realized not only as a power supply control system including a characteristic processing unit such as the above, but can also be realized as a processing method having characteristic processing such as the above as steps, or as a computer program for causing a computer to execute such steps. Also, the present disclosure can be realized as a semiconductor integrated circuit that realizes part or all of the power supply control system, or as a power system that includes the power supply control system.

Advantageous Effects

According to the present disclosure, non-power supply control processing can be executed, even in the case where a current conduction fault occurs.

BRIEF DESCRIPTION OF DRAWINGS

FIG. 15 is a chart showing the contents of a period table.

DETAILED DESCRIPTION OF PREFERRED EMBODIMENTS

Figure 1:
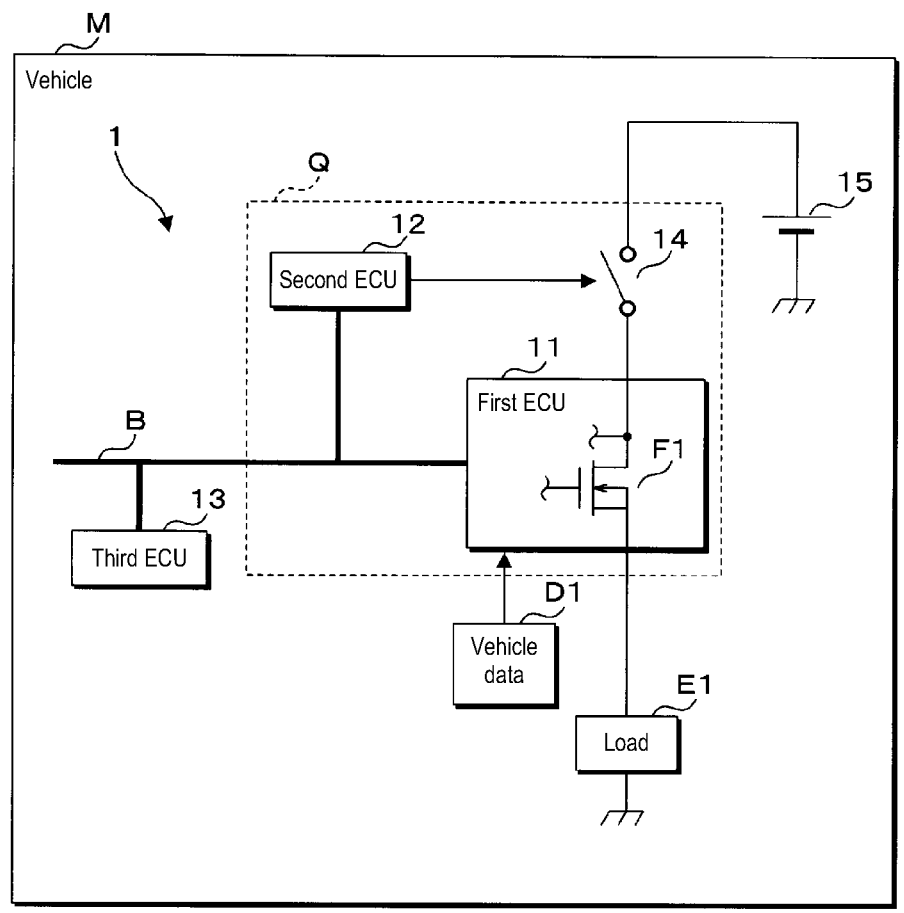
FIG. 1 is a block diagram showing the configuration of a main section of a power system according to Embodiment 1.

Initially, modes of the present disclosure will be enumerated and described. At least some of the embodiments described below may be freely combined.

[A power supply control system according to one mode of the present disclosure includes a control device configured to control power supplied through a first switch, by turning the first switch on or off, and a switching device configured to turn on or off a second switch disposed upstream of the first switch on a current path of a current flowing through the first switch, the control device including a processing unit configured to receive power supply from a connection node between the first switch and the second switch and execute processing, the processing unit instructing to turn the first switch on or off while the second switch is on, executing non-power supply control processing different from processing relating to control of power supplied through the first switch, and determining whether a current conduction fault in which a current flows through the first switch despite an instruction being given to turn off the first switch has occurred, and the switching device alternately turning the second switch on and off repeatedly, after the processing unit determines that the current conduction fault has occurred.

In the above mode, power is supplied to the load via the second switch and the first switch. After a current conduction fault of the first switch is detected, the switching device alternately turns the second switch on and off repeatedly. In the case where the on-period is short, the amount of power that is supplied through the second switch and the first switch during the on-period is small. Thus, the load effectively stops operating during the on-period. The presence of the on-period, even in the case where a current conduction fault occurs, enables the processing unit of the control device, such as a CPU (Central Processing Unit), for example, to execute non-power supply control processing.

In the power supply control system according to one mode of the present disclosure, the processing unit of the control device instructs data transmission in the non-power supply control processing.

In the above mode, if a current conduction fault occurs, the control device transmits data during the on-period.

In the power supply control system according to one mode of the present disclosure, a length of an on-period during which the second switch is on and a length of an off-period during which the second switch is off are fixed, when the switching device is alternately turning the second switch on and off repeatedly, and the on-period is shorter than the off-period.

In the above mode, if a current conduction fault occurs, the switching device alternately turns the second switch on and off repeatedly. At this time, the on-period is shorter than the off-period.

In the power supply control system according to one mode of the present disclosure, two or more of the first switch are provided, a current flowing through the second switch is divided into a plurality of currents, the plurality of currents respectively flow through the plurality of first switches, the processing unit of the control device determines, for each of the plurality of first switches, whether the current conduction fault has occurred, when the processing unit determines, for one of the plurality of first switches, that the current conduction fault has occurred, the switching device alternately turns the second switch on and off repeatedly, and the length of the on-period differs depending on the first switch in which the current conduction fault occurs.

In the above mode, if a current conduction fault occurs in one of the plurality of first switches, the switching device alternately turns the second switch on and off repeatedly. At this time, the length of the on-period differs depending on the first switch in which the current conduction fault occurs.

In the power supply control system according to one mode of the present disclosure, the processing unit executes a plurality of types of non-power supply control processing before the current conduction fault occurs in one of the plurality of first switches, and having determined, for one of the plurality of first switches, that the current conduction fault has occurred, executes non-power supply control processing that depends on the first switch in which the current conduction fault occurs, out of the plurality of types of non-power supply control processing.

In the above mode, as aforementioned, the length of the on-period differs depending on the first switch in which the current conduction fault occurs. The non-power supply control processing that is executed, out of the plurality of types of non-power supply control processing, differs depending on the first switch in which the current conduction fault occurs, that is, depending on the length of the on-period. For example, the number of types of non-power supply control processing that are executed during the on-period decreases as the length of the on-period decreases.

A processing method according to one mode of the present disclosure is a processing method in which a first computer and a second computer that receive power supply from a connection node between a first switch and a second switch disposed upstream of the first switch on a current path of a current flowing through the first switch, the first computer executing a step of instructing to turn the first switch on or off while the second switch is on, a step of executing non-power supply control processing different from processing relating to control of power supplied through the first switch, and a step of determining whether a current conduction fault in which a current flows through the first switch despite an instruction being given to turn off the first switch has occurred, the second computer executing a step of alternately instructing repeatedly to turn the second switch on and off, after the first computer determines that the current conduction fault has occurred.

In the above mode, power is supplied to the load via the second switch and the first switch. If a current conduction fault occurs in the first switch, the second switch is alternately turned on and off repeatedly. In the case where the on-period is short, the amount of power that is supplied through the second switch and the first switch during the on-period is small, and thus the load effectively stops operating. The presence of the on-period, even in the case where a current conduction fault occurs, enables the first computer, such as a CPU, for example, to execute non-power supply control processing.

Specific examples of a power system according to embodiments of the present disclosure will be described below with reference to the drawings. Note that the present disclosure is not limited to these illustrative examples and is indicated by the claims, and all changes that come within the meaning and range of equivalency of the claims are intended to be embraced therein.

Embodiment 1

Configuration of Power System

FIG. 1 is a block diagram showing the configuration of a main section of a power system 1 according to Embodiment 1. The power system 1 is installed in a vehicle M. The power system 1 includes a first ECU 11, a second ECU 12, a third ECU 13, a power switch 14, a direct current (DC) power source 15 and a load E1. ECU stands for Electronic Control Unit. The power switch 14 is a FET, a bipolar transistor, a relay contact or the like. FET stands for Field Effect Transistor. The DC power source 15 is a battery, for example. The load E1 is an electrical device. When power is being supplied to the load E1, the load E1 operates. When power supply to the load E1 stops, the load E1 stops operating.

The first ECU 11 has a power supply switch F1. The power supply switch F1 is an N-channel FET. When the power supply switch F1 is on, it is possible for current to flow through the drain and the source, due to the resistance value between the drain and the source of the power supply switch F1 being sufficiently small. When the power supply switch F1 is off, a current does not flow through the drain and the source, due to the resistance value between the drain and the source of the power supply switch F1 being sufficiently large.

In FIG. 1, a power line and a communication line are respectively indicated by a thin solid line and a thick solid line. The first ECU 11, the second ECU 12 and the third ECU 13 are connected to a communication bus B. The drain of the power supply switch F1 of the first ECU 11 is connected to one end of the power switch 14. The other end of the power switch 14 is connected to the positive electrode of the DC power source 15. The negative electrode of the DC power source 15 is grounded. The source of the power supply switch F1 is connected to one end of the load E1. The other end of the load E1 is grounded. Grounding is realized by connection to the body of the vehicle M, for example.

The second ECU 12 turns the power switch 14 on or off. The first ECU 11 turns the power supply switch F1 on or off, while the power switch 14 is on. When the first ECU 11 turns on the power supply switch F1, a current flows in order of the power switch 14, the power supply switch F1 and the load E1 from the positive electrode of the DC power source 15. Power is thereby supplied to the load E1, and the load E1 operates.

When the first ECU 11 turns off the power supply switch F1, the flow of the current through the power switch 14 and the power supply switch F1 stops. Power supply to the load E1 thereby stops, and the load E1 stops operating.

As described above, the first ECU 11 controls power supplied through the power switch 14 and the power supply switch F1, by turning the power supply switch F1 on or off. The first ECU 11 and the power supply switch F1 respectively function as a control device and a first switch. As aforementioned, when the power switch 14 and the power supply switch F1 are on, a current flows in order of the power switch 14 and the power supply switch F1. Accordingly, the power switch 14 is disposed upstream of the power supply switch F1 on the current path of the current that flows through the power supply switch F1. The second ECU 12 and the power switch 14 respectively function as a switching device and a second switch.

The system including the first ECU 11, the second ECU 12 and the power switch 14 functions as a power supply control system Q. The power supply control system Q is included in the power system 1.

Vehicle data D1 is input to the first ECU 11. As a first example, the vehicle data D1 indicates a detection value detected by a sensor installed in the vehicle M. An occupant of the vehicle M instructs operations such as turning on headlights, turning off headlights, locking doors or unlocking doors, by operating an operation unit. As a second example, the vehicle data D1 indicates an operation instructed by operating an operation unit. The first ECU 11 transmits the vehicle data D1 to the third ECU 13 via the communication bus B.

An electrical device not shown is connected to the third ECU 13. When the vehicle data D1 is received from the first ECU 11, the third ECU 13 controls the operations of the electrical device, based on the received vehicle data D1.

In the first ECU 11, a current conduction fault in which a current flows through the power supply switch F1 despite an instruction being given to turn off the power supply switch F1 possibly occurs. If a current conduction fault occurs, the resistance value between the drain and the source of the power supply switch F1 does not rise to a sufficiently high value, when an instruction to turn off the power supply switch F1 is given. Current conduction faults include a short-circuit fault in which the drain and source of the power supply switch F1 are kept in a short-circuited state despite an instruction being given to turn off the power supply switch F1.

If a current conduction fault of the power supply switch F1 occurs while the power switch 14 is on, the first ECU 11 detects the current conduction fault. The first ECU 11 transmits fault occurrence data indicating the occurrence of the current conduction fault to the second ECU 12 via the communication bus B. When the fault occurrence data is received, the second ECU 12 alternately turns the power switch 14 on and off repeatedly.

Hereinafter, in the case where the second ECU 12 is alternately turning the power switch 14 on and off repeatedly, the period during which the power switch 14 is on will be referred to as an on-period. The period during which the power switch 14 is off in the same case will be referred to as an off-period. The lengths of the on-period and the off-period are fixed. The on-period is shorter than the off-period. The on-period is one-tenth of the off-period, for example.

Power is supplied to the first ECU 11 from a connection node between the power switch 14 and the power supply switch F1. The first ECU 11 performs data transmission, power supply control and the like, using the power supplied from the connection node. When the second ECU 12 is alternately turning the power switch 14 on and off repeatedly, the first ECU 11 transmits the vehicle data D1 to the third ECU 13 during the on-period.

The load E1 is an inductive load, a resistive load or the like. An inductive load has an inductor. The inductive load is a motor, for example. A resistive load only has a resistor. The resistive load operates, due to a current flowing through the resistor.

When the second ECU 12 turns off the power switch 14, the first ECU 11 stops operating. When the power switch 14 is turned from off to on, the second ECU 12 transmits fault notification data indicating the occurrence of a current conduction fault in the power supply switch F1 to the first ECU 11 via the communication bus B.

When the second ECU 12 is alternately turning the power switch 14 on and off repeatedly, the on-period is short. Thus, in the case where the load E1 is an inductive load, the power switch 14 turns off before the load E1 operates, and the load E1 remains non-operational. In the case where the load E1 is a resistive load, the power switch 14 turns off before the effect of the load E1 appears, and the load E1 stops operating.

Configuration of First ECU 11

Figure 2:
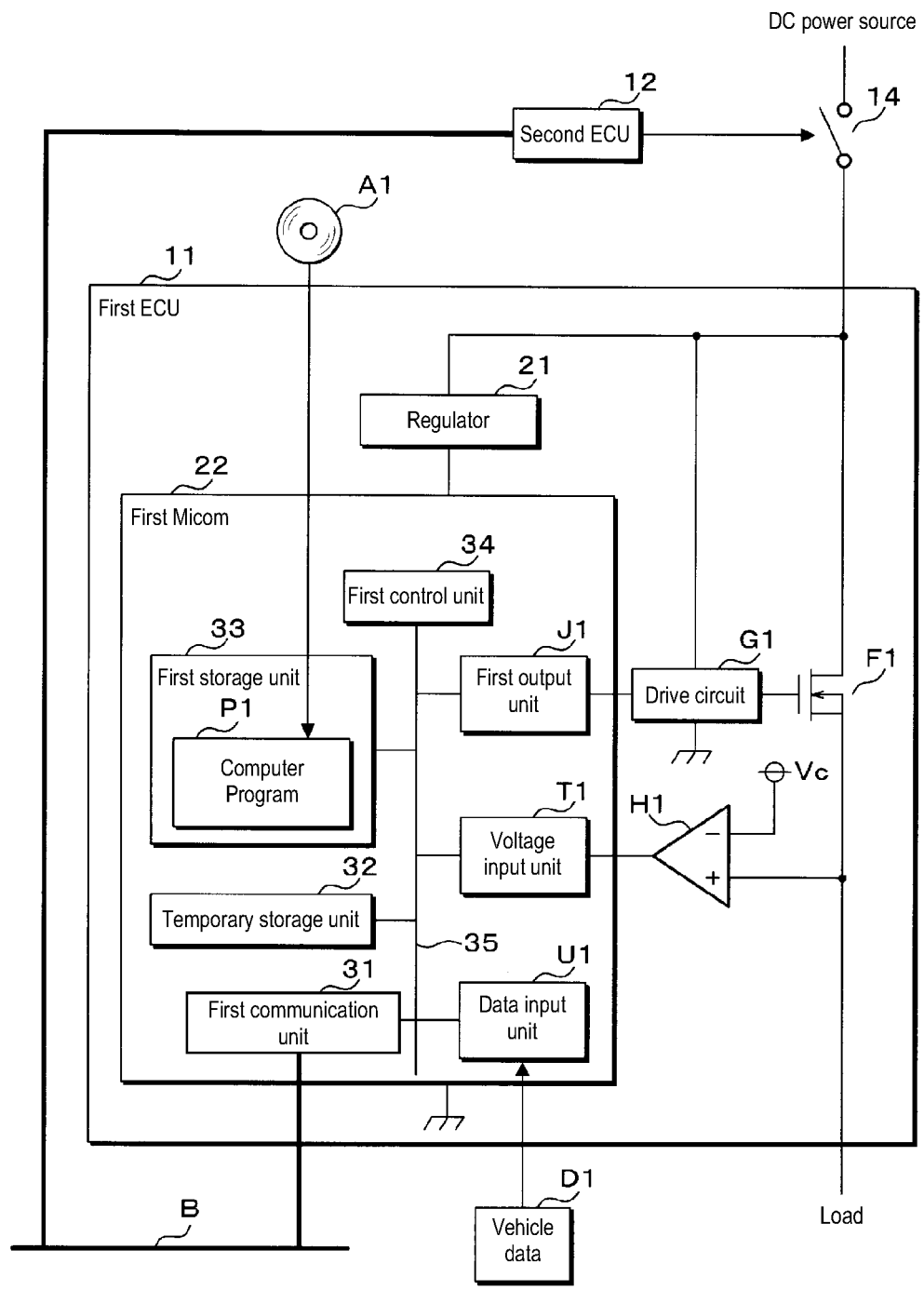
FIG. 2 is a block diagram showing the configuration of a main section of a first ECU.

FIG. 2 is a block diagram showing the configuration of a main section of the first ECU 11. In addition to the power supply switch F1, the first ECU 11 includes a regulator 21, a first microcomputer (hereinafter, first MICOM) 22, a drive circuit G1 and a comparator H1. The comparator H1 has a positive end, a negative end and an output end. The drain of the power supply switch F1 is connected to the regulator 21 and the drive circuit G1, in addition to one end of the power switch 14. The gate of the power supply switch F1 is connected to the drive circuit G1. The drive circuit G1 is grounded. The source of the power supply switch F1 is connected to the positive end of the comparator H1, in addition to one end of the load E1.

A fixed voltage $V_c$ is applied to the negative end of the comparator H1. The reference potential of the fixed voltage $V_c$ is ground potential. The output ends of the drive circuit G1, the regulator 21 and the comparator H1 are separately connected to the first MICOM 22. The first MICOM 22 is grounded.

When the power switch 14 is on, a current flows in order of the power switch 14 and the drive circuit G1 from the positive electrode of the DC power source 15. The DC power source 15 thereby supplies power to the drive circuit G1. The drive circuit G1 operates using the power supplied from the DC power source 15. When the power switch 14 is on, the regulator 21 steps down the output voltage of the DC power source 15 to a fixed voltage, and applies the fixed voltage generated by stepping down the output voltage to the first MICOM 22. A current thereby flows in order of the power switch 14, the regulator 21 and the first MICOM 22 from the positive electrode of the DC power source 15. As a result, power is supplied to the first MICOM 22 from the connection node between the power switch 14 and the power supply switch F1. The first MICOM 22 operates using the power supplied from the DC power source 15.

When the power switch 14 is on, the regulator 21 applies the fixed voltage to the comparator H1. A current flows in order of the power switch 14, the regulator 21 and the comparator H1 from the positive electrode of the DC power source 15, and power is supplied to the comparator H1. The comparator H1 operates using the power supplied from the DC power source 15. In order to prevent complicating the diagram, the connecting line between the regulator 21 and the comparator H1 is not illustrated. The comparator H1 is grounded.

Note that the fixed voltage $V_c$ may be a voltage generated by the regulator 21.

When the voltage of the gate relative to the potential of the source of the power supply switch F1 is greater than or equal to a fixed voltage, the power supply switch F1 is on. When the voltage of the gate relative to the potential of the source of the power supply switch F1 is less than the fixed voltage, the power supply switch F1 is off.

The first MICOM 22 has a first output unit J1. The first output unit J1 is connected to the drive circuit G1. The first output unit J1 outputs a voltage to the drive circuit G1. The first output unit J1 switches the output voltage to a high level voltage or a low level voltage. When the first output unit J1 switches the output voltage from the low level voltage to the high level voltage, the drive circuit G1 raises the voltage of the gate of the power supply switch F1 relative to ground potential. The voltage of the gate relative to the potential of the source of the power supply switch F1 thereby rises to a voltage equal to or greater than the fixed voltage. As a result, the power supply switch F1 turns from off to on.

When the first output unit J1 switches the output voltage from the high level voltage to the low level voltage, the drive circuit G1 lowers the voltage of the gate of the power supply switch F1 relative to ground potential. The voltage of the gate relative to the potential of the source of the power supply switch F1 is thereby lowered to a voltage less than the fixed voltage. As a result, the power supply switch F1 turns from on to off.

As described above, the drive circuit G1 turns the power supply switch F1 on or off, according to the output voltage of the first output unit J1.

The first MICOM 22 further includes a voltage input unit T1. The voltage input unit T1 is connected to the output end of the comparator H1. Hereinafter, the voltage of the source of the power supply switch F1 relative to ground potential will be referred to as a source voltage. The comparator H1 compares the source voltage of the power supply switch F1 with the fixed voltage $V_c$. When the source voltage of the power supply switch F1 is greater than or equal to the fixed voltage $V_c$, the comparator H1 outputs the high level voltage to the voltage input unit T1. When the source voltage of the power supply switch F1 is less than the fixed voltage $V_c$, the comparator H1 outputs the low level voltage to the voltage input unit T1.

The fixed voltage $V_c$ exceeds zero V and is less than the power supply voltage between the ends of the DC power source 15. When the power supply switch F1 is on, the source voltage of the power supply switch F1 substantially matches the power supply voltage of the DC power source 15. Accordingly, when the power supply switch F1 is on, the output voltage of the comparator H1 is the high level voltage. When the power supply switch F1 is off, a current does not flow through the load E1. Thus, the source voltage of the power supply switch F1 is zero V. Accordingly, when the power supply switch F1 is off, the output voltage of the comparator H1 is the low level voltage.

Configuration of First MICOM 22

In addition to the first output unit J1 and the voltage input unit T1, the first MICOM 22 includes a first communication unit 31, a temporary storage unit 32, a first storage unit 33, a first control unit 34 and a data input unit U1. While power is being supplied to the first MICOM 22 from the connection node between the power switch 14 and the power supply switch F1, power is supplied to the first communication unit 31, the temporary storage unit 32, the first storage unit 33, the first control unit 34, the first output unit J1, the voltage input unit T1 and the data input unit U1. Accordingly, power is supplied to each of the first communication unit 31, the temporary storage unit 32, the first storage unit 33, the first control unit 34, the first output unit J1, the voltage input unit T1 and the data input unit U1 from the connection node between the power switch 14 and the power supply switch F1.

The first communication unit 31, the temporary storage unit 32, the first storage unit 33, the first control unit 34, the first output unit J1, the voltage input unit T1 and the data input unit U1 are connected to a first bus 35. As aforementioned, the first output unit J1 and the voltage input unit T1 are respectively connected to the drive circuit G1 and the comparator H1. The first communication unit 31 is further connected to the communication bus B.

The first output unit J1 switches the output voltage that is being output to the drive circuit G1 to the high level voltage or the low level voltage, in accordance with an instruction from the first control unit 34. As aforementioned, the comparator H1 outputs the high level voltage or the low level voltage to the voltage input unit T1. The vehicle data D1 is input to the data input unit U1.

The first communication unit 31 transmits the vehicle data D1 to the third ECU 13 via the communication bus B, in accordance with an instruction from the first control unit 34. The first communication unit 31 transmits fault occurrence data to the second ECU 12 via the communication bus B, in accordance with an instruction from the first control unit 34. The first communication unit 31 receives the fault notification data from the second ECU 12 via the communication bus B.

The first control unit 34 writes data to the temporary storage unit 32. When power supply to the first MICOM 22 from the connection node between the power switch 14 and the power supply switch F1 stops, data that is stored in the temporary storage unit 32 is deleted. Data that is stored in the temporary storage unit 32 is read out by the first control unit 34.

The first storage unit 33 is a non-volatile memory, for example. A computer program P1 is stored in the first storage unit 33. The first control unit 34 has a processing element that executes processing, such as a CPU, for example, and functions as a processing unit. The first control unit 34 also functions as a first computer. The processing element of the first control unit 34 executes transmission processing, power supply control processing, write processing and the like in parallel, by executing the computer program P1.

In the transmission processing, the first control unit 34 executes processing for transmitting the vehicle data D1. The transmission processing differs from processing relating to control of power supplied through the power supply switch F1. The transmission processing corresponds to non-power supply control processing. In the power supply control processing, the first control unit 34 executes processing for controlling power supply to the load E1. In the write processing, the first control unit 34 writes fault data indicating that a current conduction fault has occurred in the power supply switch F1 to the temporary storage unit 32.

Note that the computer program P1 may be provided to the first MICOM 22, using a non-transitory storage medium A1 on which the computer program P1 is readably recorded. The storage medium A1 is a portable memory, for example. Examples of portable memories include a CD-ROM, a USB (Universal Serial Bus) memory, an SD card, a micro SD card and a compact flash (registered trademark). In the case where the storage medium A1 is a portable memory, the processing element of the first control unit 34 may read the computer program P1 from the storage medium A1 using a reading device not shown. The read computer program P1 is stored in the first storage unit 33. Furthermore, the computer program P1 may be provided to the first MICOM 22, by a communication unit not shown of the first MICOM 22 communicating with an external device. In this case, the processing element of the first control unit 34 acquires the computer program P1 through the communication unit. The acquired computer program P1 is stored in the first storage unit 33.

The number of processing elements included in the first control unit 34 is not limited to 1 and may be 2 or more. In the case where the first control unit 34 has a plurality of processing elements, the plurality of processing elements may jointly execute the transmission processing, the power supply control processing, the write processing and the like.

Configuration of Second ECU 12

Figure 3:
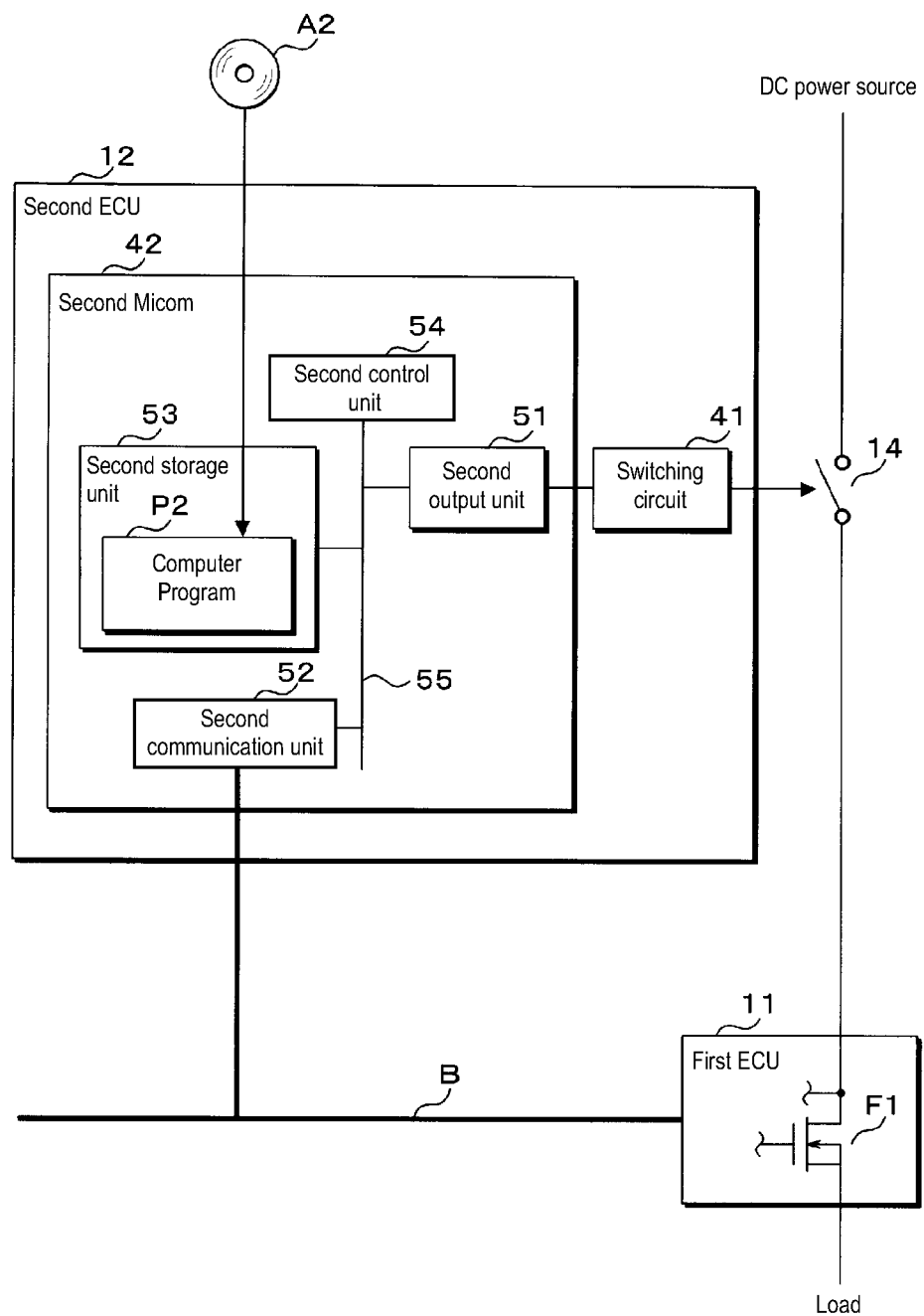
FIG. 3 is a block diagram showing the configuration of a main section of a second ECU.

FIG. 3 is a block diagram showing the configuration of a main section of the second ECU 12. The second ECU 12 includes a switching circuit 41 and a second microcomputer (hereinafter, second MICOM) 42. The second MICOM 42 has a second output unit 51. The second output unit 51 is connected to the switching circuit 41. The second output unit 51 outputs a voltage to the switching circuit 41. When the second output unit 51 switches the output voltage from the low level voltage to the high level voltage, the switching circuit 41 turns the power switch 14 from off to on. When the second output unit 51 switches the output voltage from the high level voltage to the low level voltage, the switching circuit 41 turns the power switch 14 from on to off.

In addition to the second output unit 51, the second MICOM 42 includes a second communication unit 52, a second storage unit 53 and a second control unit 54. The second output unit 51, the second communication unit 52, the second storage unit 53 and the second control unit 54 are connected to a second bus 55. The second communication unit 52 is further connected to the communication bus B.

The second output unit 51 switches the output voltage that is being output to the switching circuit 41 to the high level voltage or the low level voltage, in accordance with an instruction from the second control unit 54. The second communication unit 52 transmits fault notification data to the first communication unit 31 of the first ECU 11 via the communication bus B, in accordance with an instruction from the second control unit 54. The second communication unit 52 receives fault occurrence data from the first communication unit 31 of the first ECU 11 via the communication bus B.

The second storage unit 53 is a non-volatile memory, for example. The second storage unit 53 stores a computer program P2. The second control unit 54 includes a processing element that executes processing, such as a CPU, for example. The second control unit 54 also functions as a second computer. The processing element of the second control unit 54 executes switch control processing, by executing the computer program P2. In the switch control processing, the second control unit 54 executes processing for turning the power switch 14 on or off.

Note that the computer program P2 may be provided to the second MICOM 42, using a non-transitory storage medium A2 on which the computer program P2 is readably recorded. The storage medium A2 is a portable memory, for example. In the case where the storage medium A2 is a portable memory, the processing element of the second control unit 54 may read the computer program P2 from the storage medium A2 using a reading device not shown. The read computer program P2 is stored in the second storage unit 53. Furthermore, the computer program P2 may be provided to the second MICOM 42, by a communication unit not shown of the second MICOM 42 communicating with an external device. In this case, the processing element of the second control unit 54 acquires the computer program P2 through the communication unit. The acquired computer program P2 is stored in the second storage unit 53.

The number of processing elements included in the second control unit 54 is not limited to 1 and may be 2 or more. In the case where the second control unit 54 has a plurality of processing elements, the plurality of processing elements may jointly execute the switch control processing and the like.

Transmission Processing by First ECU 11

Figure 4:
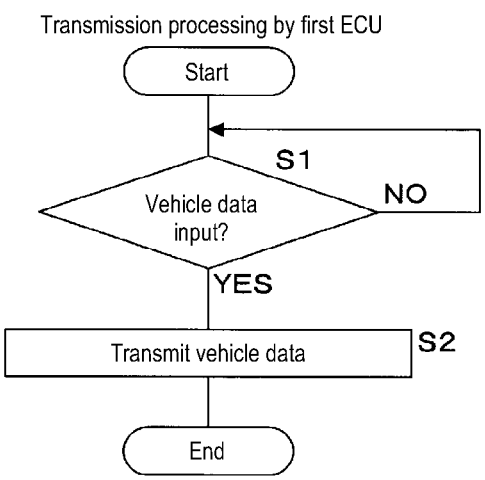
FIG. 4 is a flowchart showing the procedure of transmission processing by the first ECU.

FIG. 4 is a flowchart showing the procedure of transmission processing by the first ECU 11. In the transmission processing, the first control unit 34 of the first ECU 11, first, determines whether vehicle data D1 has been input to the data input unit U1 (step S1). If it is determined that vehicle data D1 has not been input (S1: NO), the first control unit 34 executes step S1 again and waits until vehicle data D1 is input to the data input unit U1. If it is determined that vehicle data D1 has been input (S1: YES), the first control unit 34 instructs the first communication unit 31 to transmit the vehicle data D1 to the third ECU 13 (step S2). The first control unit 34 ends the transmission processing after executing step S2.

After ending the transmission processing, the first control unit 34 executes the transmission processing again. Whenever vehicle data D1 is input to the data input unit U1 while power is being supplied to the first MICOM 22, that is, while the power switch 14 is on, the first communication unit 31 transmits the input vehicle data D1 to the third ECU 13.

Power Supply Control Processing by First ECU 11

Figure 5:
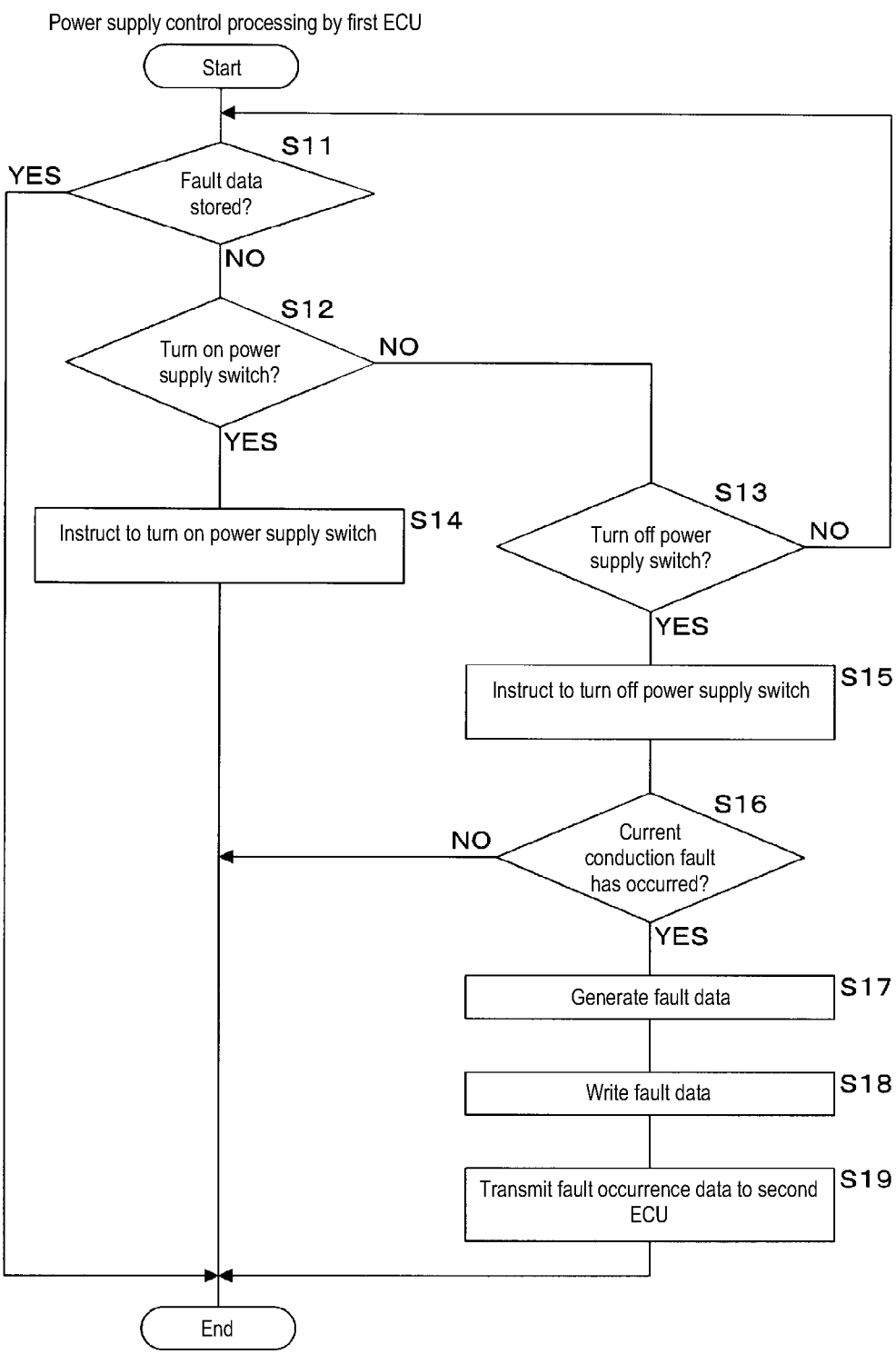
FIG. 5 is a flowchart showing the procedure of power supply control processing by the first ECU.

FIG. 5 is a flowchart showing the procedure of power supply control processing by the first ECU 11. When power is supplied to the first MICOM 22 of the first ECU 11, due to the power switch 14 turning on, the first MICOM 22 starts up. When the first MICOM 22 starts up, the first control unit 34 executes the power supply control processing.

In the power supply control processing, the first control unit 34, first, determines whether fault data is stored in the temporary storage unit 32 (step S11). If it is determined that fault data is not stored in the temporary storage unit 32 (S11: NO), the first control unit 34 determines whether to turn on the power supply switch F1 (step S12).

In step S12, if an on signal instructing to turn on the power supply switch F1 has been input to a signal input unit not shown, for example, the first control unit 34 determines to turn on the power supply switch F1. With this configuration, when an on signal has not been input to the signal input unit, the first control unit 34 determines not to turn on the power supply switch F1.

If it is determined not to turn on the power supply switch F1 (S12: NO), the first control unit 34 determines whether to turn off the power supply switch F1 (step S13). In step S13, if an off signal instructing to turn off the power supply switch F1 has been input to the signal input unit, the first control unit 34 determines to turn off the power supply switch F1. With this configuration, if an off signal has not been input to the signal input unit, the first control unit 34 determines not to turn off the power supply switch F1.

If it is determined not to turn off the power supply switch F1 (S13: NO), the first control unit 34 executes step S11 again. The first control unit 34 waits until fault data is written to the temporary storage unit 32 or the timing for turning the power supply switch F1 on or off arrives.

If it is determined that fault data is stored in the temporary storage unit 32 (S11: YES), the first control unit 34 ends the power supply control processing. In this case, the first control unit 34 does not execute the power supply control processing until power supply to the first ECU 11 stops. Power supply to the first ECU 11 stops when the power switch 14 turns off. When the first MICOM 22 of the first ECU 11 starts up, the first control unit 34 executes the power supply control processing again.

If it is determined to turn on the power supply switch F1 (S12: YES), the first control unit 34 instructs the drive circuit G1 to turn on the power supply switch F1, by instructing the first output unit J1 to switch the output voltage to the high level voltage (step S14). When the power supply switch F1 turns on, power is supplied to the load E1, as aforementioned.

If it is determined to turn off the power supply switch F1 (S13: YES), the first control unit 34 instructs the drive circuit G1 to turn off the power supply switch F1, by instructing the first output unit J1 to switch the output voltage to the low level voltage (step S15). When the power supply switch F1 turns off, power supply to the load E1 stops, as abovementioned. When the power supply switch F1 is off, the source voltage of the power supply switch F1 is zero V.

If a current conduction fault of the power supply switch F1 occurs, current continues to flow through the power supply switch F1. When a current flows through the power supply switch F1, the source voltage of the power supply switch F1 exceeds zero V. When the source voltage is greater than or equal to the fixed voltage $V_c$ despite an instruction being given to turn off the power supply switch F1, a current conduction fault of the power supply switch F1 has occurred. As aforementioned above, when the source voltage is greater than or equal to the fixed voltage $V_c$, the comparator H1 outputs the high level voltage.

After executing step S15, the first control unit 34 determines whether a current conduction fault of the power supply switch F1 has occurred, based on the output voltage of the comparator H1 (step S16). In step S16, if the output voltage of the comparator H1 is the high level voltage, the first control unit 34 determines that a current conduction fault has occurred. If the output voltage of the comparator H1 is the low level voltage, the first control unit 34 determines that a current conduction fault has not occurred.

If it is determined that a current conduction fault has occurred (S16: YES), the first control unit 34 generates fault data (step S17) and writes the generated fault data to the temporary storage unit 32 (step S18). After executing step S18, the first control unit 34 instructs the first communication unit 31 to transmit fault occurrence data to the second communication unit 52 of the second ECU 12 via the communication bus B (step S19). After executing one of steps S14 and S19, or if it is determined that a current conduction fault has not occurred (S16: NO), the first control unit 34 ends the power supply control processing. In this case, the first control unit 34 executes the power supply control processing again.

As described above, the first control unit 34 of the first ECU 11 instructs to turn the power supply switch F1 on or off while the power switch 14 is on. The drive circuit G1 turns the power supply switch F1 on or off, until the first control unit 34 detects a current conduction fault. When a current conduction fault is detected, the first control unit 34 writes fault data to the temporary storage unit 32 and notifies the second ECU 12 that a current conduction fault has occurred. When fault data is stored in the temporary storage unit 32, the first control unit 34 stops execution of the power supply control processing until power supply to the first ECU 11 stops.

Switch Control Processing by Second ECU 12

Figure 6:
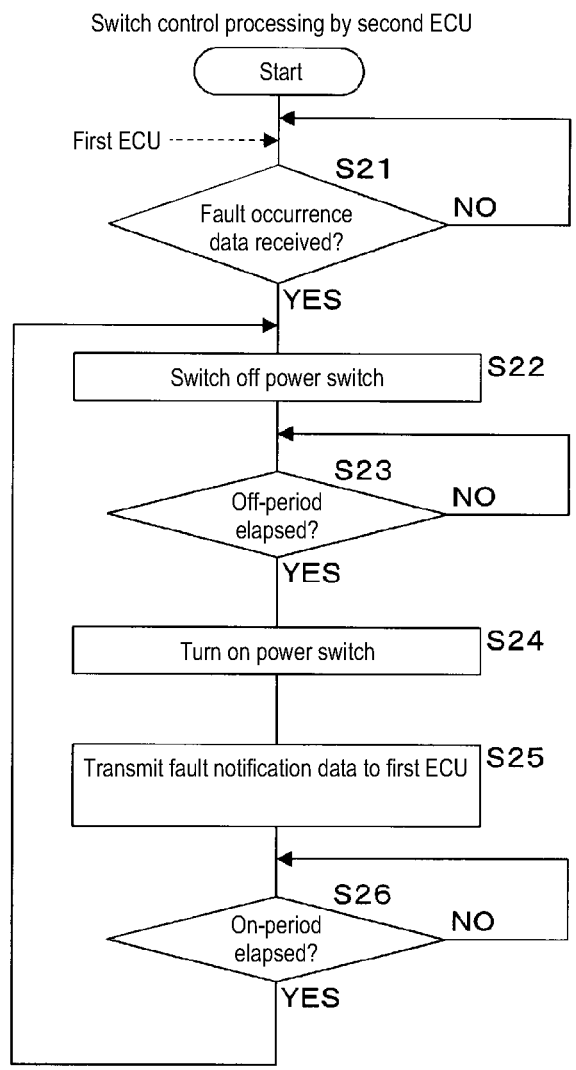
FIG. 6 is a flowchart showing the procedure of switch control processing by the second ECU.

FIG. 6 is a flowchart showing the procedure of switch control processing by the second ECU 12. The second control unit 54 of the second ECU 12 determines whether the second communication unit 52 has received fault occurrence data from the first communication unit 31 of the first ECU 11 (step S21). If it is determined that the second communication unit 52 has not received fault occurrence data (S21: NO), the second control unit 54 executes step S21 again and waits until the second communication unit 52 receives fault occurrence data.

If it is determined that the second communication unit 52 has received fault occurrence data (S21: YES), the second control unit 54 causes the switching circuit 41 to turn off the power switch 14, by instructing the second output unit 51 to switch the output voltage to the low level voltage (step S22). Power supply to the load E1 thereby stops. When the power switch 14 turns off, power supply to the first MICOM 22, the drive circuit G1, the comparator H1 and the like of the first ECU 11 stops. When power supply to the first MICOM 22 stops, the first MICOM 22 stops operating, and the fault data that is stored in the temporary storage unit 32 of the first MICOM 22 is erased.

After executing step S22, the second control unit 54 determines whether a fixed off-period has elapsed from when the switching circuit 41 turned off the power switch 14 (step S23). If it is determined that the off-period has not elapsed (S23: NO), the second control unit 54 executes step S23 again and waits until the off-period elapses.

If it is determined that the off-period has elapsed (S23: YES), the second control unit 54 causes the switching circuit 41 to turn on the power switch 14, by instructing the second output unit 51 to switch the output voltage to the high level voltage (step S24). When the power switch 14 turns on, power is supplied to the first MICOM 22, the drive circuit G1, the comparator H1 and the like of the first ECU 11. When power is supplied to the first MICOM 22, the first MICOM 22 starts up. At this time, fault data is not stored in the temporary storage unit 32 of the first MICOM 22.

After executing step S24, the second control unit 54 instructs the second communication unit 52 to transmit fault notification data to the first communication unit 31 of the first ECU 11 (step S25). The first ECU 11 is thereby notified that a current conduction fault has occurred in the power supply switch F1. After executing step S25, the second control unit 54 determines whether a fixed on-period has elapsed from when the power switch 14 turned on (step S26). If it is determined that the on-period has not elapsed (S26: NO), the second control unit 54 executes step S26 again and waits until the on-period elapses.

While power is being supplied to the first MICOM 22, the first control unit 34 executes transmission processing. Accordingly, when vehicle data D1 is input to the data input unit U1 during the on-period, the first communication unit 31 transmits the vehicle data D1 input to the data input unit U1 to the third ECU 13.

If it is determined that the on-period has elapsed (S26: YES), the second control unit 54 executes step S22 again. As a result, after the second communication unit 52 receives the fault occurrence data, the switching circuit 41 alternately turns the power switch 14 on and off repeatedly. In other words, after the first control unit 34 of the first ECU 11 determines that a current conduction fault of the power supply switch F1 has occurred, the second control unit 54 alternately instructs repeatedly to turn the power switch 14 on and off.

Write Processing by First ECU 11

Figure 7:
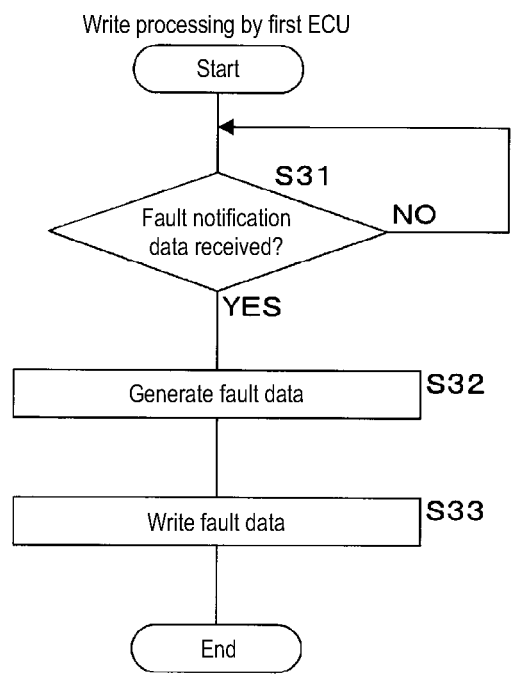
FIG. 7 is a flowchart showing the procedure of write processing by the first ECU.

FIG. 7 is a flowchart showing the procedure of write processing by the first ECU 11. When the first MICOM 22 of the first ECU 11 starts up, the first control unit 34 executes the write processing. In the write processing, the first control unit 34 of the first ECU 11 determines whether the first communication unit 31 has received fault notification data from the second communication unit 52 of the second ECU 12 (step S31). If it is determined that the first communication unit 31 has not received fault notification data (S31: NO), the first control unit 34 executes step S31 again and waits until the first communication unit 31 receives fault notification data.

If it is determined that the first communication unit 31 has received fault notification data (S31: YES), the first control unit 34 generates fault data (step S32), and writes the generated fault data to the temporary storage unit 32 (step S33). After executing step S33, the first control unit 34 ends the write processing.

As described above, in the first ECU 11, when the first communication unit 31 receives fault notification data, the first control unit 34 writes fault data to the temporary storage unit 32. As aforementioned, in the switch control processing, the second control unit 54 causes the second communication unit 52 to transmit fault notification data, after instructing the switching circuit 41 to turn on the power switch 14. When the power switch 14 turns on, the first MICOM 22 of the first ECU 11 starts up, and the first control unit 34 executes the power supply control processing. However, because the first communication unit 31 receives the fault notification data immediately after the power switch 14 turns on, the first control unit 34 ends the power supply control processing immediately after the first MICOM 22 starts up.

Operations of First ECU 11 and Second ECU 12

Figure 8:
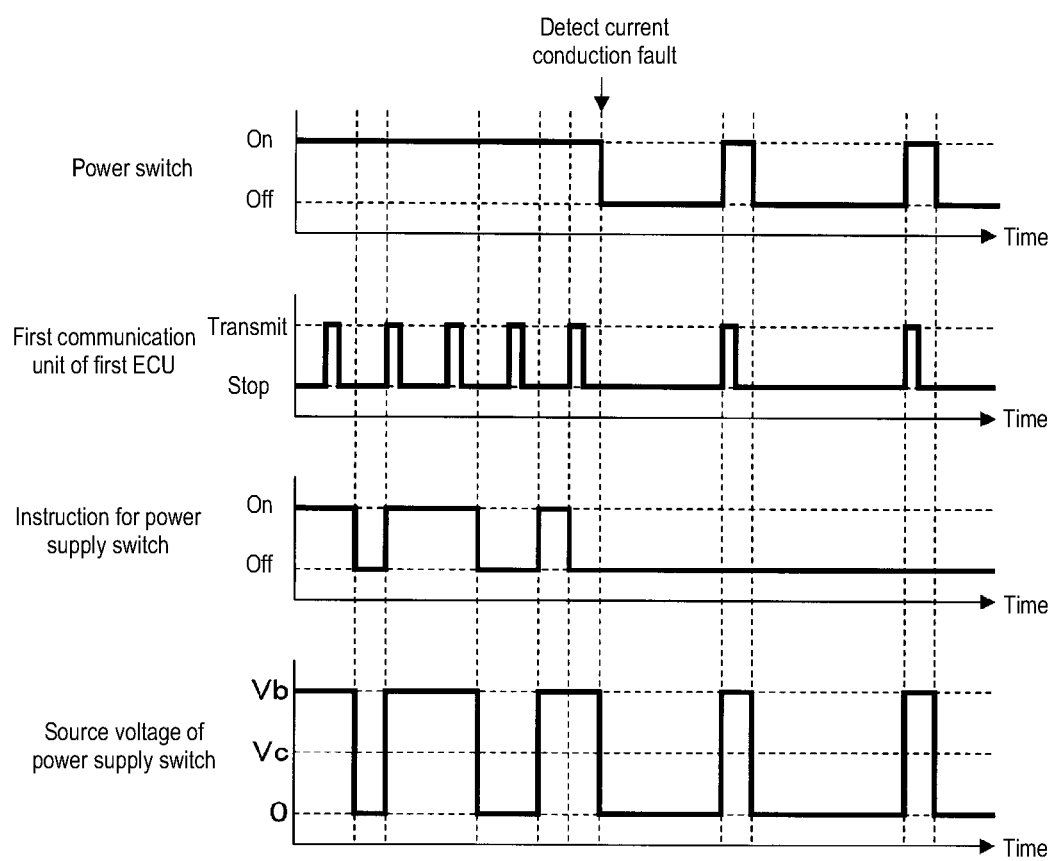
FIG. 8 is a timing chart for describing operations of the first ECU and the second ECU.

FIG. 8 is a timing chart for describing the operations of the first ECU 11 and the second ECU 12. FIG. 8 shows transitions of the state of the power switch 14, the state of the first communication unit 31 of the first ECU 11, the instruction for the power supply switch F1, and the source voltage of the power supply switch F1. The horizontal axes of these transitions show time. $V_b$ indicates the power supply voltage of the DC power source 15.

Before a current conduction fault is detected, the switching circuit 41 of the second ECU 12 keeps the power switch 14 on. While the switching circuit 41 is keeping the power switch 14 on, in the first ECU 11, whenever vehicle data D1 is input to the data input unit U1, the first communication unit 31 transmits the vehicle data D1. While the switching circuit 41 is keeping the power switch 14 on, the first control unit 34 instructs the drive circuit G1 to turn the power supply switch F1 on or off.

When the state of the first ECU 11 is normal, the drive circuit G1 turns the power supply switch F1 on or off, in accordance with an instruction from the first control unit 34. Accordingly, while the first control unit 34 is instructing to turn on the power supply switch F1, the source voltage of the power supply switch F1 is the power supply voltage $V_b$ of the DC power source 15. The power supply voltage $V_b$ is greater than or equal to the fixed voltage $V_c$. While the first control unit 34 is instructing to turn off the power supply switch F1, the source voltage of the power supply switch F1 is zero V. Zero V is less than the fixed voltage $V_c$.

When the source voltage of the power supply switch F1 is greater than or equal to the fixed voltage $V_c$ despite an instruction being given to turn off the power supply switch F1, the first control unit 34 determines that a current conduction fault of the power supply switch F1 has occurred. A current conduction fault of the power supply switch F1 is thereby detected by the first control unit 34.

When the first control unit 34 of the first ECU 11 detects a current conduction fault, the switching circuit 41 of the second ECU 12 turns off the power switch 14. When a current conduction fault is detected, the first control unit 34 of the first ECU 11 ends the power supply control processing, and does not execute the power supply control processing until the first MICOM 22 of the first ECU 11 starts up again.

After the first control unit 34 detects a current conduction fault, the switching circuit 41 of the second ECU 12 alternately turns the power switch 14 on and off repeatedly. As aforementioned, the lengths of the on-period and off-period of the power switch 14 are fixed. The on-period is shorter than the off-period. Accordingly, the amount of power that is supplied to the load E1 through the power switch 14 and the power supply switch F1 during the on-period is small.

Accordingly, in the case where the load E1 is an inductive load, the power switch 14 turns off before the load E1 operates. As a result, the load E1 effectively stops operating during the on-period. In the case where the load E1 is a resistive load, the power switch 14 turns off before the effect of the load E1 appears, and the load E1 stops operating.

The presence of the on-period, even in the case where a current conduction fault occurs, enables the first control unit 34 of the first ECU 11 to execute the transmission processing. Accordingly, in the first ECU 11, when vehicle data D1 is input to the data input unit U1 during the on-period, the first communication unit 31 transmits the vehicle data D1.

In the second ECU 12, the second communication unit 52 transmits fault notification data to the first communication unit 31 of the first ECU 11, when the switching circuit 41 turns on the power switch 14. Thus, the first control unit 34 of the first ECU 11 ends the power supply control processing before instructing to turn on the power supply switch F1.

Embodiment 2

In Embodiment 1, the first ECU 11 controls power supply to the load E1. However, the first ECU 11 may control not only power supply to the load E1 but also supply power to other loads.

Hereinafter, the differences of Embodiment 2 from Embodiment 1 will be described. Since the configuration other than that described below is common to Embodiment 1, components common to Embodiment 1 will be given the same reference numerals as Embodiment 1, and description thereof will be omitted.

Figure 9:
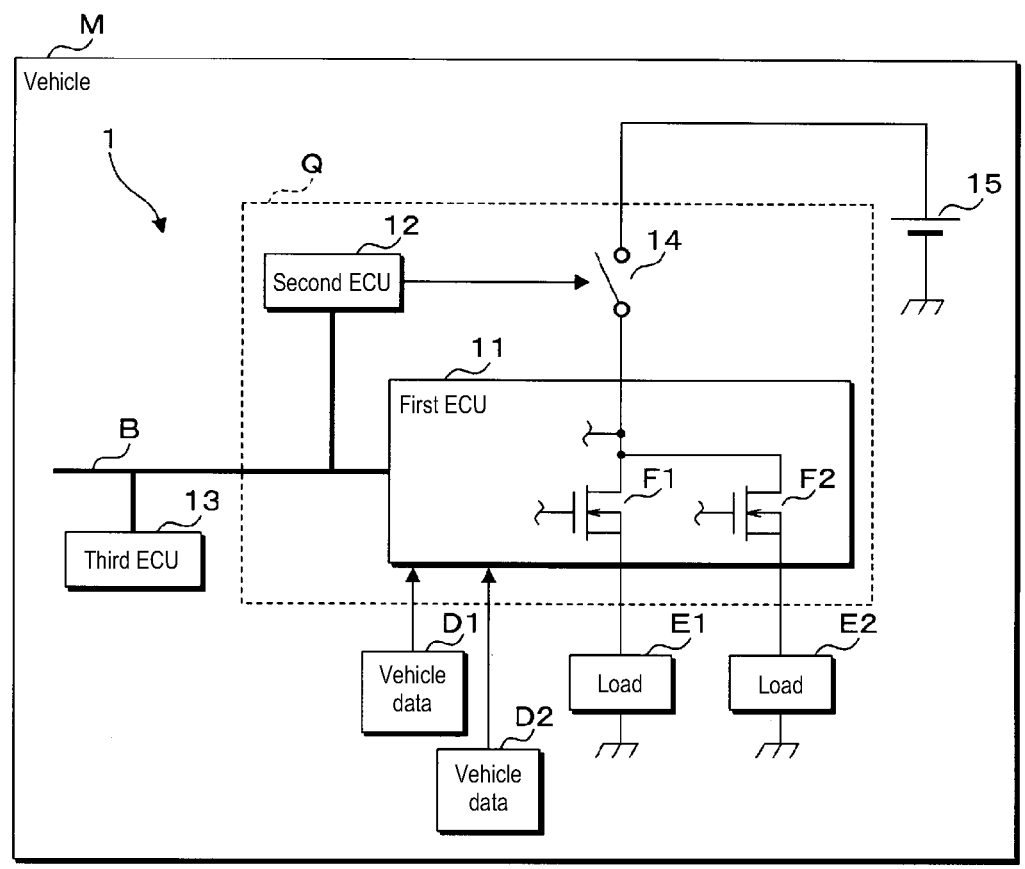
FIG. 9 is a block diagram showing the configuration of a main section of a power system according to Embodiment 2.

FIG. 9 is a block diagram showing the configuration of a main section of a power system 1 of Embodiment 2. The power system 1 of Embodiment 2 is provided with similar components to the power system 1 of Embodiment 1. The power system 1 of Embodiment 2 further includes a load E2. The load E2 is an electrical device. The load E2 operates similarly to the load E1. The first ECU 11 includes not only the power supply switch F1 but also a power supply switch F2. The power supply switch F2 is an N-channel FET. The power supply switch F2 operates similarly to the power supply switch F1. The power supply switch F2 also functions as a first switch.

In FIG. 9, the power line and the communication line are respectively indicated by a thin solid line and a thick solid line. The drain of the power supply switch F2 is connected to one end of the power switch 14. The source of the power supply switch F2 is connected to the load E2. The other end of the load E2 is grounded.

The first ECU 11 turns the power supply switch F2 on or off, while the power switch 14 is on. When the first ECU 11 turns on the power supply switch F2, a current flows in order of the power switch 14, the power supply switch F2 and the load E2 from the positive electrode of the DC power source 15. Power is thereby supplied to the load E2, and the load E2 operates. When the first ECU 11 turns off the power supply switch F2, the flow of the current through the power switch 14 and the power supply switch F2 stops. Power supply to the load E2 thereby stops, and the load E2 stops operating.

When the power switch 14 and the power supply switches F1 and F2 are on, the current flowing through the power switch 14 is divided into two currents. These currents respectively flow through the power supply switches F1 and F2. The power switch 14 is disposed upstream of the current path of the current that flows through the power supply switch F1 and upstream of the current path of the current that flows through the power supply switch F2.

Similarly to Embodiment 1, the first ECU 11 controls power supplied through the power switch 14 and the power supply switch F1, by turning the power supply switch F1 on or off. As aforementioned, the first ECU 11 controls power supplied through the power switch 14 and the power supply switch F2, by turning the power supply switch F2 on or off.

The first ECU 11 receives input of not only the vehicle data D1 but also vehicle data D2. The vehicle data D2 indicates a detection value of a sensor or an operation, similarly to the vehicle data D1. Two electrical devices not shown are connected to the third ECU 13. When vehicle data D1 is received from the first ECU 11, the third ECU 13 controls the operations of one of the electrical devices, based on the received vehicle data D1. When vehicle data D2 is received from the first ECU 11, the third ECU 13 controls the operations of the other electrical device, based on the received vehicle data D2.

In the first ECU 11, not only a current conduction fault of the power supply switch F1 but also a current conduction fault in which a current flows through the power supply switch F2 despite an instruction being given to turn off the power supply switch F2 possibly occurs. Current conduction faults of the power supply switch F2 includes a short-circuit fault of the power supply switch F2, similarly to current conduction faults of the power supply switch F1.

If a current conduction fault of the power supply switch F1 or the power supply switch F2 occurs while the power switch 14 is on, the first ECU 11 detects the current conduction fault of the power supply switch F1 or the power supply switch F2. Similarly to Embodiment 1, the first ECU 11 transmits fault occurrence data indicating the occurrence of a current conduction fault to the second ECU 12 via the communication bus B. The fault occurrence data indicates which of the power supply switches F1 and F2 has suffered the current conduction fault. When fault occurrence data is received, the second ECU 12 alternately turns the power switch 14 on and off repeatedly.

When the second ECU 12 is alternately turning the power switch 14 on and off repeatedly, the length of the on-period differs depending on which of the power supply switches F1 and F2 has suffered the current conduction fault. The on-period is longer when a current conduction fault of the power supply switch F1 occurs. The on-period is shorter when a current conduction fault of the power supply switch F2 occurs.

Accordingly, in the case where the second ECU 12 is alternately turning the power switch 14 on and off repeatedly, the first ECU 11 transmits the vehicle data D1 and D2 to the third ECU 13 during the on-period, when a current conduction fault of the power supply switch F1 occurs. In the same case, the first ECU 11 transmits the vehicle data D2 to the third ECU 13 during the on-period, when a current conduction fault of the power supply switch F2 occurs. The first ECU 11 does not transmit the vehicle data D1 to the third ECU 13 during the on-period.

The load E2 is an inductive load, a resistive load or the like, similarly to the load E1. When the power switch 14 is turned from off to on, the second ECU 12 transmits fault notification data indicating the occurrence of a current conduction fault in the power supply switch F1 or the power supply switch F2 to the first ECU 11 via the communication bus B. The fault notification data indicates which of the power supply switches F1 and F2 has suffered the current conduction fault.

Assume that the load E2 is an inductive load. When the second ECU 12 is alternately turning the power switch 14 on and off repeatedly, the power switch 14 turns off before the load E2 operates, and the load E2 remains non-operational. Assume that the load E2 is a resistive load. When the second ECU 12 is alternately turning the power switch 14 on and off repeatedly, the power switch 14 turns off before the effect of the load E2 appears, and the load E2 stops operating.

The period from when the power switch 14 turns on until the effect of the resistive load appears will be referred to as a resistive period. The period from when the power switch 14 turns on until the inductive load operates will be referred to as an inductive period. Normally, the resistive period is longer than the inductive period. Accordingly, the on-period of a power supply switch that is connected to a resistive load can be set to a longer period than the on-period of a power supply switch connected to an inductive load.

For example, the loads E1 and E2 are respectively a resistive load and an inductive load. In this case, as abovementioned, the on-period of the power supply switch F1 can be set to a longer period than the on-period of the power supply switch F2.

When the power switch 14 is turned from off to on, the second ECU 12 transmits fault notification data indicating the occurrence of a current conduction fault in the power supply switch F1 or the power supply switch F2 to the first ECU 11 via the communication bus B. The fault notification data indicates which of the power supply switches F1 and F2 has suffered the current conduction fault.

Configuration of First ECU 11

Figure 10:
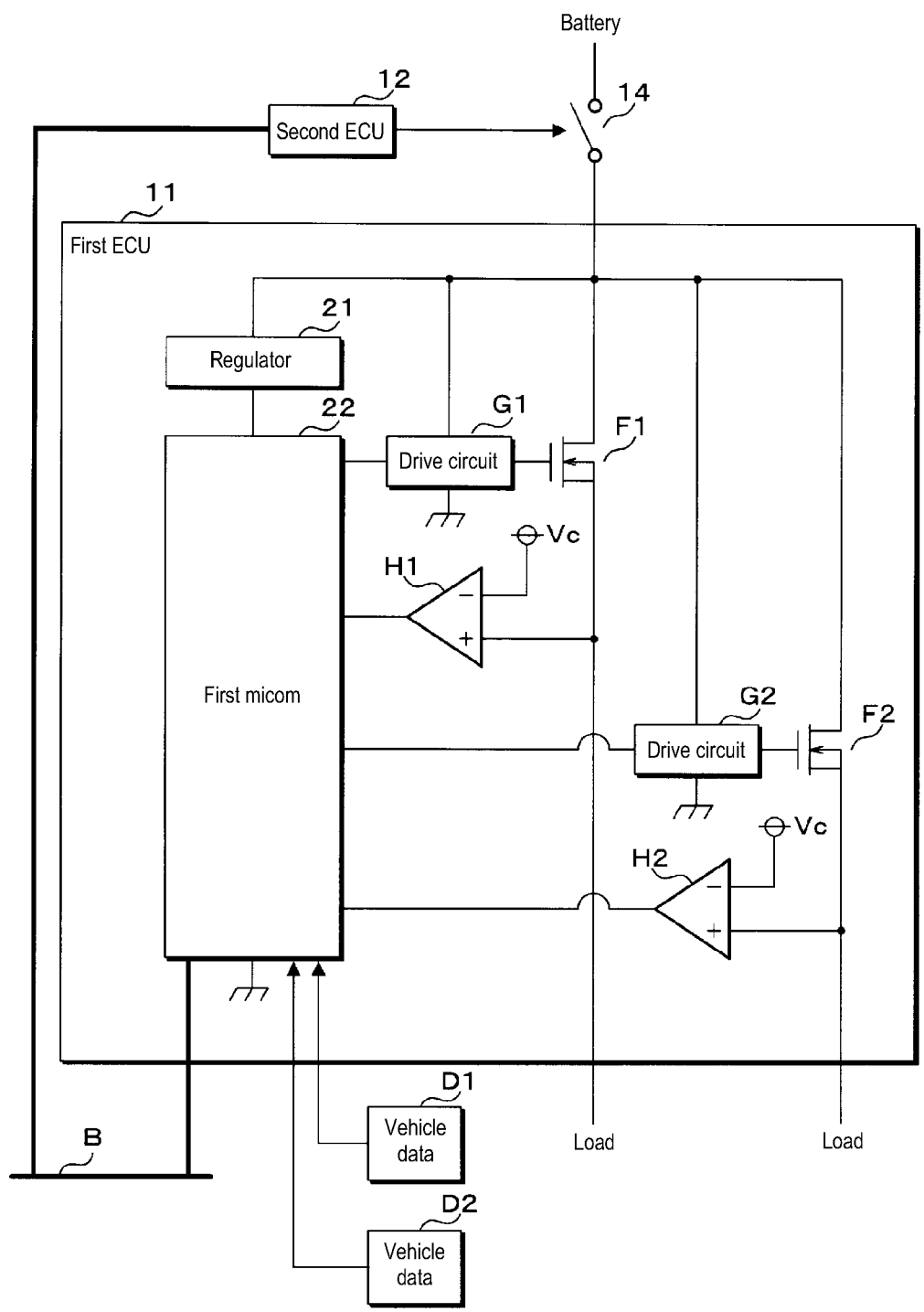
FIG. 10 is a block diagram showing the configuration of a main section of the first ECU.

FIG. 10 is a block diagram showing the configuration of a main section of the first ECU 11. The first ECU 11 of Embodiment 2 has similar components to the first ECU 11 of Embodiment 1. The first ECU 11 of Embodiment 2 further includes the power supply switch F2, a drive circuit G2 and a comparator H2. The comparator H2 has a positive end, a negative end and an output end.

The drain of the power supply switch F2 is connected to the drive circuit G2 in addition to one end of the power switch 14. The gate of the power supply switch F2 is connected to the drive circuit G2. The drive circuit G2 is grounded. The source of the power supply switch F2 is connected to the positive end of the comparator H2, in addition to one end of the load E2. A fixed voltage $V_c$ is applied to the negative end of the comparator H2. The output ends of the drive circuit G2 and the comparator H2 are separately connected to the first MICOM 22.

Power is respectively supplied to the drive circuit G2 and the comparator H2 similarly to the drive circuit G1 and the comparator H1. The power supply switch F2 is configured similarly to the power supply switch F1.

Figure 11:
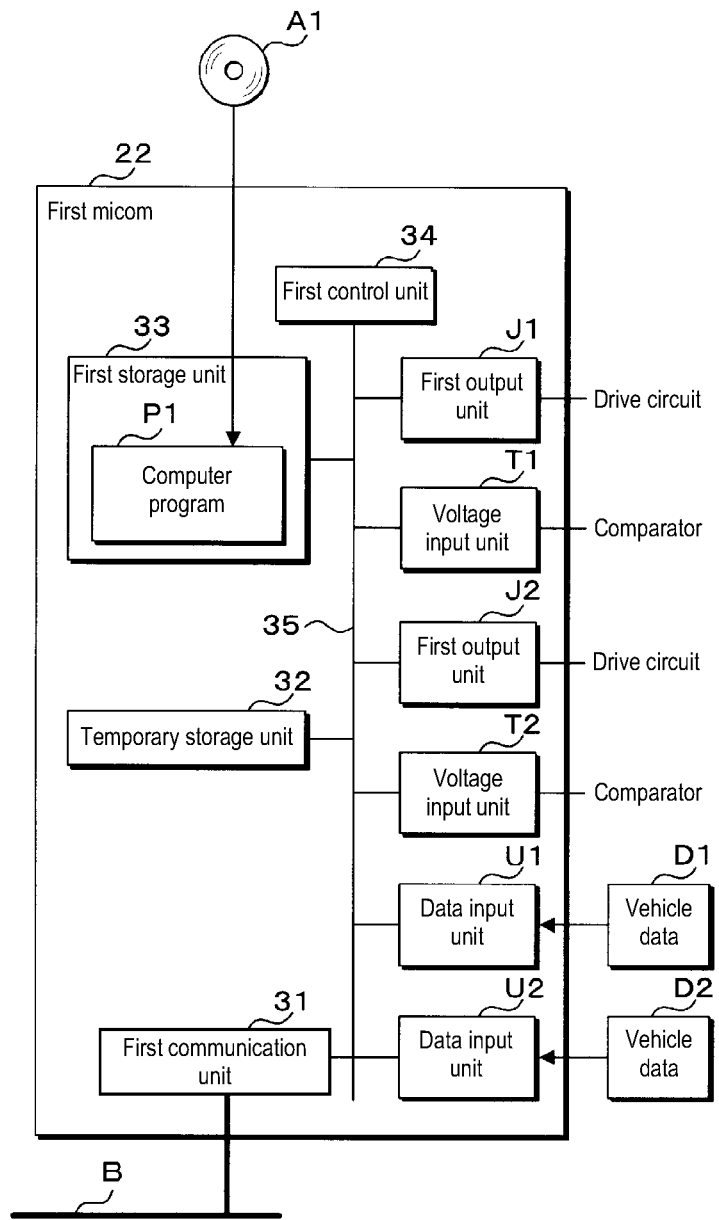
FIG. 11 is a block diagram showing the configuration of a main section of a first microcomputer.

FIG. 11 is a block diagram showing the configuration of a main section of the first MICOM 22. As shown in FIG. 11, the first MICOM 22 of Embodiment 2 has similar components to the first MICOM 22 of Embodiment 1. The first MICOM 22 of Embodiment 2 further includes a first output unit J2, a voltage input unit T2 and a data input unit U2.

The first output unit J2 is connected to the drive circuit G2. The first output unit J2 and the drive circuit G2 respectively operate similarly to the first output unit J1 and the drive circuit G1. Accordingly, when the first output unit J2 switches the output voltage from the low level voltage to the high level voltage, the drive circuit G2 turns the power supply switch F2 from off to on. When the first output unit J2 switches the output voltage from the high level voltage to the low level voltage, the drive circuit G2 turns the power supply switch F2 from on to off.

The voltage input unit T2 is connected to the output end of the comparator H2. In the description of Embodiment 2, the voltage of the source of the power supply switches F1 and F2 relative to ground potential will be referred to as a source voltage. The comparator H2 operates similarly to the comparator H1. Accordingly, when the source voltage of the power supply switch F2 is greater than or equal to the fixed voltage $V_c$, the comparator H2 outputs the high level voltage to the voltage input unit T2. When the source voltage of the power supply switch F2 is less than the fixed voltage $V_c$, the comparator H2 outputs the low level voltage to the voltage input unit T2.

When the power supply switch F2 is on, the source voltage of the power supply switch F2 substantially matches the power supply voltage of the DC power source 15. Accordingly, when the power supply switch F2 is on, the output voltage of the comparator H2 is the high level voltage. When the power supply switch F2 is off, a current does not flow through the load E2. Thus, the source voltage of the power supply switch F2 is zero V. Accordingly, when the power supply switch F2 is off, the output voltage of the comparator H2 is the low level voltage.

Configuration of First MICOM 22

In the first MICOM 22 of Embodiment 2, the first output unit J2, the voltage input unit T2 and the data input unit U2 are connected to the first bus 35. While power is being supplied to the first MICOM 22 from the connection node between the power switch 14 and the power supply switch F1, power is supplied to the first communication unit 31, the temporary storage unit 32, the first storage unit 33, the first control unit 34, the first output units J1 and J2, the voltage input units T1 and T2 and the data input units U1 and U2. Accordingly, power is supplied to each of the first communication unit 31, the temporary storage unit 32, the first storage unit 33, the first control unit 34, the first output units J1 and J2, the voltage input units T1 and T2 and the data input units U1 and U2 from the connection node between the power switch 14 and the power supply switch F1.

The first output unit J2 switches the output voltage that is being output to the drive circuit G2 to the high level voltage or the low level voltage, in accordance with an instruction from the first control unit 34, similarly to the first output unit J1. As aforementioned, the comparator H2 outputs the high level voltage or the low level voltage to the voltage input unit T2. The vehicle data D2 is input to the data input unit U2. The first communication unit 31 transmits not only the vehicle data D1 but also the vehicle data D2 to the third ECU 13 via the communication bus B, in accordance with an instruction from the first control unit 34.

The processing element of the first control unit 34 executes transmission processing of the vehicle data D1 and D2, power supply control processing of the loads E1 and E2, write processing, execution stop processing and the like in parallel, by executing the computer program P1.

In the respective transmission processing of the vehicle data D1 and D2, the first control unit 34 executes processing for transmitting the vehicle data D1 and D2. The transmission processing of the vehicle data D1 and D2 differs from the processing relating to control of power supplied through the power supply switches F1 and F2. The respective transmission processing of the vehicle data D1 and D2 corresponds to non-power supply control processing.

In the respective power supply control processing of the loads E1 and E2, the first control unit 34 executes processing for controlling power supply to the loads E1 and E2. In the write processing, the first control unit 34 writes fault data indicating that a current conduction fault has occurred in the power supply switch F1 or the power supply switch F2 to the temporary storage unit 32. The fault data indicates which of the power supply switches F1 and F2 has suffered the current conduction fault. In the execution stop processing, the first control unit 34 stops execution of one of transmission processing of the vehicle data D1 and transmission processing of the vehicle data D2.

The number of processing elements included in the first control unit 34 is not limited to 1 and may be 2 or more. In the case where the first MICOM 22 has a plurality of first control units 34, the plurality of first control units 34 may jointly execute the transmission processing of the vehicle data D1 and D2, the power supply control processing of the loads E1 and E2, the write processing, the execution stop processing and the like.

Transmission Processing by First ECU 11

The first control unit 34 of the first ECU 11 executes the transmission processing of the vehicle data D1 similarly to Embodiment 1. The transmission processing of the vehicle data D2 is similar to the transmission processing of the vehicle data D1. The transmission processing of the vehicle data D2 can be described by respectively replacing the data input unit U1 and the vehicle data D1 with the data input unit U2 and the vehicle data D2 in the description of the transmission processing of the vehicle data D1.

Power Supply Control Processing by First ECU 11

Figure 12:
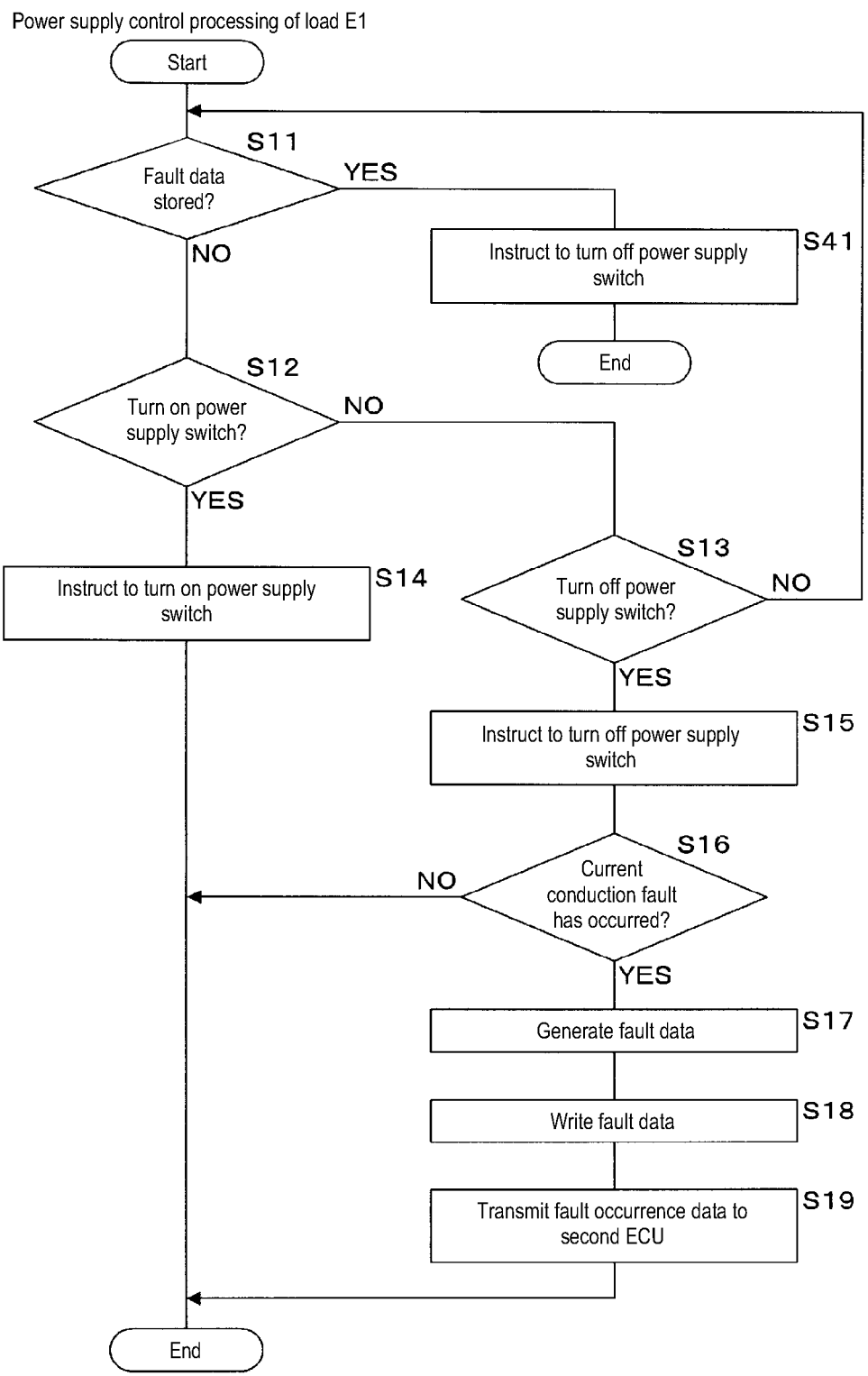
FIG. 12 is a flowchart showing the procedure of processing for controlling power supply to a load.

FIG. 12 is a flowchart showing the procedure of power supply control processing of the load E1. When power is supplied to the first MICOM 22 of the first ECU 11, due to the power switch 14 turning on, the first MICOM 22 starts up. When the first MICOM 22 starts up, the first control unit 34 executes the power supply control processing.

In the power supply control processing of the load E1, the first control unit 34 executes steps S11 to S19 similarly to the power supply control processing in Embodiment 1. Description of steps S11 to S19 will be omitted. In step S11 of the power supply control processing of the load E1, the first control unit 34 determines whether fault data indicating the power supply switch F1 or the power supply switch F2 is stored in the temporary storage unit 32. If it is determined that fault data is not stored in the temporary storage unit 32 (S11: NO), the first control unit 34 executes step S12.

If it is determined that fault data is stored in the temporary storage unit 32 (S11: YES), the first control unit 34 instructs the drive circuit G1 to turn off the power supply switch F1, by instructing the first output unit J1 to switch the output voltage to the low level voltage (step S41). If the fault data that is stored in the temporary storage unit 32 indicates the power supply switch F1, the drive circuit G1 turns the power supply switch F1 from on to off, when the power supply switch F1 is on. The first control unit 34 ends the power supply control processing after executing step S41. In this case, the first control unit 34 does not execute the power supply control processing of the load E1, until power supply to the first ECU 11 stops.

In step S17, the first control unit 34 generates fault data indicating the power supply switch F1. In step S19, the first control unit 34 instructs the first communication unit 31 to transmit fault occurrence data indicating the power supply switch F1 to the second communication unit 52 of the second ECU 12 via the communication bus B.

The first control unit 34 executes power supply control processing of the load E2, similarly to the power supply control processing of the load E1. The load E1, the power supply switches F1 and F2, the first output unit J1, the drive circuit G1 and the comparator H1 are respectively replaced by the load E2, the power supply switches F2 and F1, the first output unit J2, the drive circuit G2 and the comparator H2 in the description of power supply control processing of the load E1. The power supply control processing of the load E2 can thereby be described. Accordingly, in the power supply control processing of the load E2, the first control unit 34 writes fault data indicating the power supply switch F2 to the temporary storage unit 32. Furthermore, the first control unit 34 instructs the first communication unit 31 to transmit fault occurrence data indicating the power supply switch F2 to the second communication unit 52 of the second ECU 12 via the communication bus B.

In step S16 of the power supply control processing of the load E1, the first control unit 34 determines, for the power supply switch F1, whether a current conduction fault has occurred. In step S16 of the power supply control processing of the load E2, the first control unit 34 determines, for the power supply switch F2, whether a current conduction fault has occurred. If it is determined, for one of the power supply switches F1 and F2, that a current conduction fault has occurred, the first control unit 34 instructs the first communication unit 31 to transmit fault occurrence data indicating the power supply switch F1 or the power supply switch F2 to the second communication unit 52 of the second ECU 12.

Execution Stop Processing by First ECU 11

Figures 13, 14:
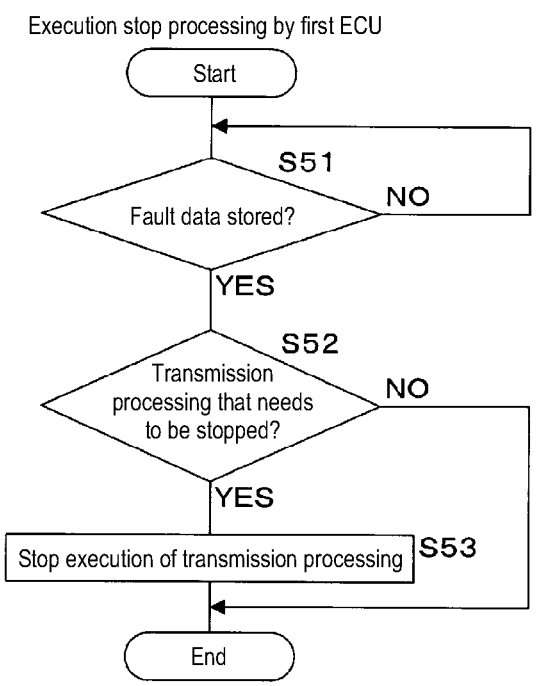
FIG. 13 is a flowchart showing the procedure of execution stop processing by the first ECU.
FIG. 14 is a diagram showing the relationship between power supply switches indicated by fault data and transmission processing that needs to be stopped.

FIG. 13 is a flowchart showing the procedure of execution stop processing by the first ECU 11. When the first MICOM 22 of the first ECU 11 starts up, the first control unit 34 executes the execution stop processing. In the execution stop processing, the first control unit 34 of the first ECU 11, first, determines whether fault data indicating the power supply switch F1 or the power supply switch F2 is stored in the temporary storage unit 32 (step S51). If it is determined that fault data is not stored in the temporary storage unit 32 (S51: NO), the first control unit 34 executes step S51 again and waits until fault data is stored in the temporary storage unit 32.

If it is determined that fault data is stored (S51: YES), the first control unit 34 determines whether the transmission processing of one of the vehicle data D1 and D2 needs to be stopped (step S52).

FIG. 14 is a diagram showing the relationship between faulty power supply switches and transmission processing that needs to be stopped. As shown in FIG. 14, when a current conduction fault of the power supply switch F1 has occurred, there is no transmission processing that needs to be stopped. If a current conduction fault of the power supply switch F2 has occurred, the transmission processing of the vehicle data D1 needs to be stopped.

In step S52 shown in FIG. 13, if it is determined that the fault data that is stored in the temporary storage unit 32 indicates the power supply switch F1, the first control unit 34 determines that there is no transmission processing that needs to be stopped. If the fault data that is stored in the temporary storage unit 32 indicates the power supply switch F2, the first control unit 34 determines that there is transmission processing that needs to be stopped.

If it is determined that there is transmission processing that needs to be stopped (S52: YES), the first control unit 34 stops execution of the transmission processing that needs to be stopped, that is, execution of the transmission processing of the vehicle data D1 (step S53). If it is determined that there is no transmission processing that needs to be stopped (S52: NO), or after executing step S53, the first control unit 34 ends the execution stop processing.

As described above, when fault data indicating the power supply switch F2 is stored in the temporary storage unit 32, execution of the transmission processing of the vehicle data D1 is stopped.

Switch Control Processing by Second ECU 12

The switch control processing in Embodiment 2 is similar to the switch control processing in Embodiment 1. Accordingly, when the second communication unit 52 receives fault occurrence data from the first communication unit 31 of the first ECU 11, the switching circuit 41 of the second ECU 12 alternately turns the power switch 14 on and off repeatedly. As aforementioned, the length of the on-period differs depending on which of the power supply switches F1 and F2 has suffered the current conduction fault. The length of the off-period also differs depending on which of the power supply switches F1 and F2 has suffered the current conduction fault. The second storage unit 53 stores a period table indicating the on-periods and off periods corresponding to faulty power supply switches.

FIG. 15 is a chart showing the contents of the period table. As shown in FIG. 15, the period table shows the on-period and off-period corresponding to the power supply switch F1 and the on-period and off-period corresponding to the power supply switch F2. As aforementioned, the on-period of the power supply switch F1 is longer than the on-period of the power supply switch F2. The off-period of the power supply switch F1 is shorter than the off-period of the power supply switch F2. The total of the on-period and off-period of the power supply switch F1 is the same as the total of the on-period and off-period of the power supply switch F2. For both the power supply switches F1 and F2, the on-period is shorter than the off-period.

In step S21 of the switch control processing in Embodiment 2, the second control unit 54 determines whether the second communication unit 52 has received fault occurrence data indicating the power supply switch F1 or the power supply switch F2 from the first communication unit 31 of the first ECU 11. When the fault occurrence data received by the second communication unit 52 indicates the power supply switch F1, the on-period and off-period of the power supply switch F1 shown in the period table are used. When the fault occurrence data received by the second communication unit 52 indicates the power supply switch F2, the on-period and off-period of the power supply switch F2 shown in the period table are used.

When the fault occurrence data received by the second communication unit 52 indicates the power supply switch F1, the second control unit 54, in step S25, instructs the second communication unit 52 to transmit fault notification data indicating the power supply switch F1 to the first communication unit 31 of the first ECU 11. When the fault occurrence data received by the second communication unit 52 indicates the power supply switch F2, the second control unit 54, in step S25, instructs the second communication unit 52 to transmit fault notification data indicating the power supply switch F2 to the first communication unit 31 of the first ECU 11.

As described above, in the second ECU 12, when the second communication unit 52 receives fault occurrence data indicating the power supply switch F1 or the power supply switch F2, the switching circuit 41 alternately turns the power switch 14 on and off repeatedly. As aforementioned, the lengths of the on-period and the off-period differ depending on which of the power supply switches F1 and F2 has suffered the current conduction fault.

Write Processing by First ECU 11

The write processing in Embodiment 2 is similar to the write processing in Embodiment 1. In step S31, the first control unit 34 of the first ECU 11 determines whether the first communication unit 31 has received fault notification data indicating the power supply switch F1 or the power supply switch F2 from the second communication unit 52 of the second ECU 12. When the fault detection data received by the first communication unit 31 indicates the power supply switch F1, the first control unit 34, in step S32, generates fault data indicating the power supply switch F1. In step S33, the fault data indicating the power supply switch F1 is written to the temporary storage unit 32.

When the fault detection data received by the first communication unit 31 indicates the power supply switch F2, the first control unit 34, in step S32, generates fault data indicating the power supply switch F2. In step S33, the fault data indicating the power supply switch F2 is written to the temporary storage unit 32. In Embodiment 2, similarly to Embodiment 1, the first communication unit 31 receives fault notification data immediately after the power switch 14 turns on, and thus the first control unit 34 ends the power supply control processing of the loads E1 and E2 immediately after the first MICOM 22 starts up. When the fault notification data received by the first communication unit 31 indicates the power supply switch F2, execution of the transmission processing of the vehicle data D1 stops. When the fault notification data received by the first communication unit 31 indicates the power supply switch F1, the transmission processing of the vehicle data D1 and D2 is executed.

Operations of First ECU 11 and Second ECU 12

Figure 16:
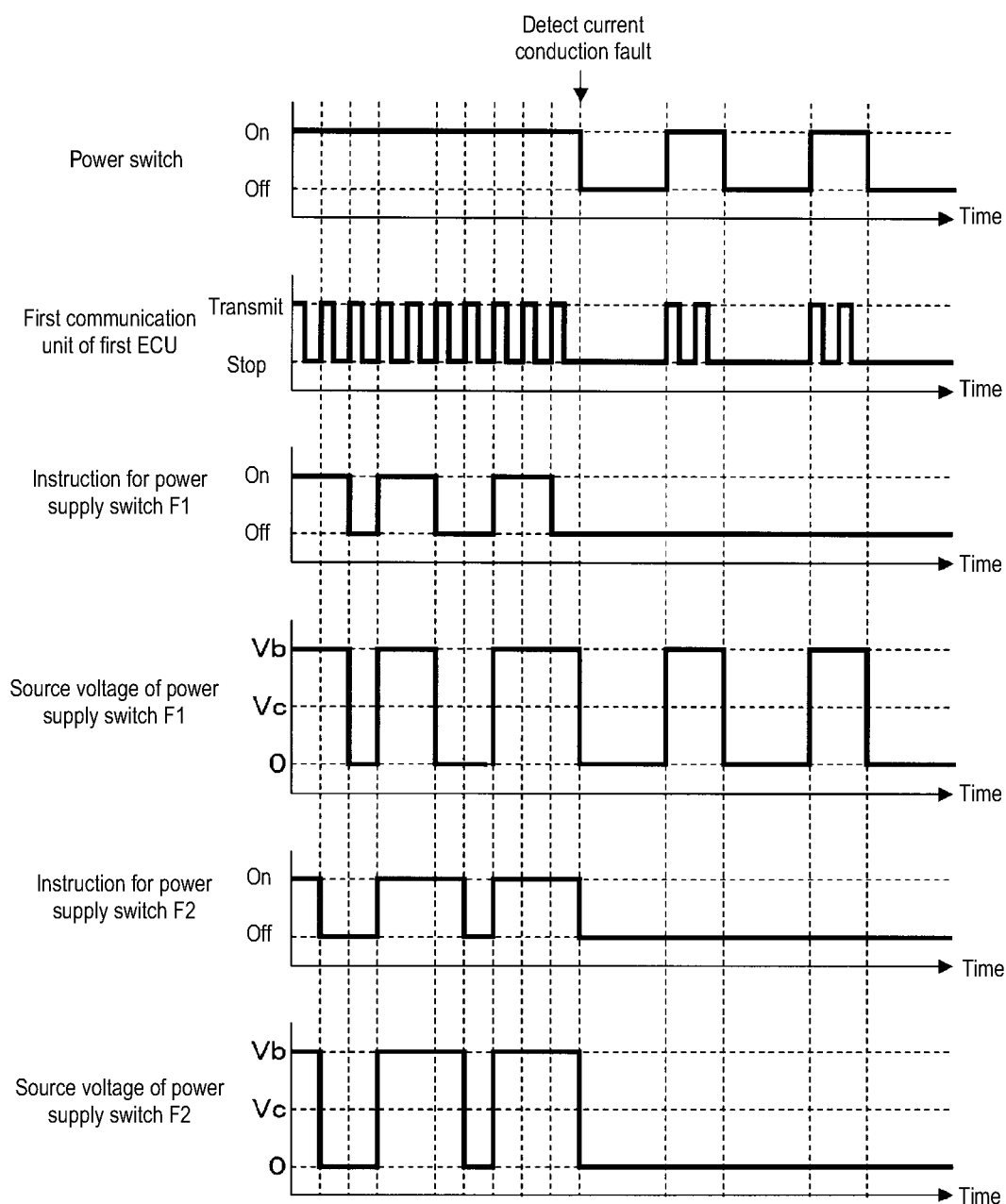
FIG. 16 is a timing chart for describing the operations of the first ECU and the second ECU.

FIG. 16 is a timing chart for describing the operations of the first ECU 11 and the second ECU 12. FIG. 16 shows transitions of the state of the power switch 14, the state of the first communication unit 31 of the first ECU 11, the instruction for the power supply switch F1, the source voltage of the power supply switch F1, the instruction for the power supply switch F2, and the source voltage of the power supply switch F2. The horizontal axes of these transitions show time.

FIG. 16 shows operations in the case where a current conduction fault of the power supply switch F1 occurs. Before a current conduction fault of the power supply switch F1 or the power supply switch F2 is detected, the switching circuit 41 of the second ECU 12 keeps the power switch 14 on. While the switching circuit 41 is keeping the power switch 14 on, in the first ECU 11, whenever vehicle data D1 is input to the data input unit U1, the first communication unit 31 transmits the vehicle data D1. Whenever time vehicle data D2 is input to the data input unit U2, the first communication unit 31 transmits the vehicle data D2.

While the switching circuit 41 is keeping the power switch 14 on, the first control unit 34 instructs the drive circuit G1 to turn the power supply switch F1 on or off. Furthermore, the first control unit 34 instructs the drive circuit G2 to turn the power supply switch F2 on or off.

When the state of the first ECU 11 is normal, the drive circuits G1 and G2 respectively turn the power supply switches F1 and F2 on or off, in accordance with an instruction from the first control unit 34. Accordingly, while the first control unit 34 is instructing to turn on the power supply switch F1, the source voltage of the power supply switch F1 is the power supply voltage $V_b$ of the DC power source 15. While the first control unit 34 is instructing to turn on the power supply switch F2, the source voltage of the power supply switch F2 is the power supply voltage Vb of the DC power source 15. While the first control unit 34 is instructing to turn off the power supply switch F1, the source voltage of the power supply switch F1 is zero V. While the first control unit 34 is instructing to turn off the power supply switch F2, the source voltage of the power supply switch F2 is zero V. The power supply voltage $V_b$ is greater than or equal to the fixed voltage $V_c$. Zero V is less than the fixed voltage $V_c$.

When the source voltage of the power supply switch F1 is greater than or equal to the fixed voltage $V_c$ despite an instruction being given to turn off the power supply switch F1, the first control unit 34 determines that a current conduction fault of the power supply switch F1 has occurred. A current conduction fault of the power supply switch F1 is thereby detected by the first control unit 34.

When the first control unit 34 of the first ECU 11 detects a current conduction fault of the power supply switch F1, the first control unit 34 instructs the drive circuit G1 to turn off the power supply switch F1. Furthermore, the switching circuit 41 of the second ECU 12 turns off the power switch 14. When a current conduction fault of the power supply switch F1 or the power supply switch F2 is detected, the first control unit 34 of the first ECU 11 ends the power supply control processing of the loads E1 and E2, and does not execute the power supply control processing of the loads E1 and E2, until the first MICOM 22 of the first ECU 11 starts up again.

After the first control unit 34 detects a current conduction fault, the switching circuit 41 of the second ECU 12 alternately turns the power switch 14 on and off repeatedly. The presence of the on-period, even in the case where a current conduction fault occurs, enables the first control unit 34 of the first ECU 11 to execute the transmission processing of the vehicle data D1 and D2. Accordingly, in the first ECU 11, when vehicle data D1 is input to the data input unit U1 during the on-period, the first communication unit 31 transmits the vehicle data D1. Similarly, when vehicle data D2 is input to the data input unit U2 during the on-period, the first communication unit 31 transmits the vehicle data D2.

In the second ECU 12, the second communication unit 52 transmits fault notification data indicating the power supply switch F1 to the first communication unit 31 of the first ECU 11, when the switching circuit 41 turns on the power switch 14. Thus, the first control unit 34 of the first ECU 11 ends the power supply control processing of the loads E1 and E2 before instructing to turn on the power supply switches F1 and F2.

Figure 17:
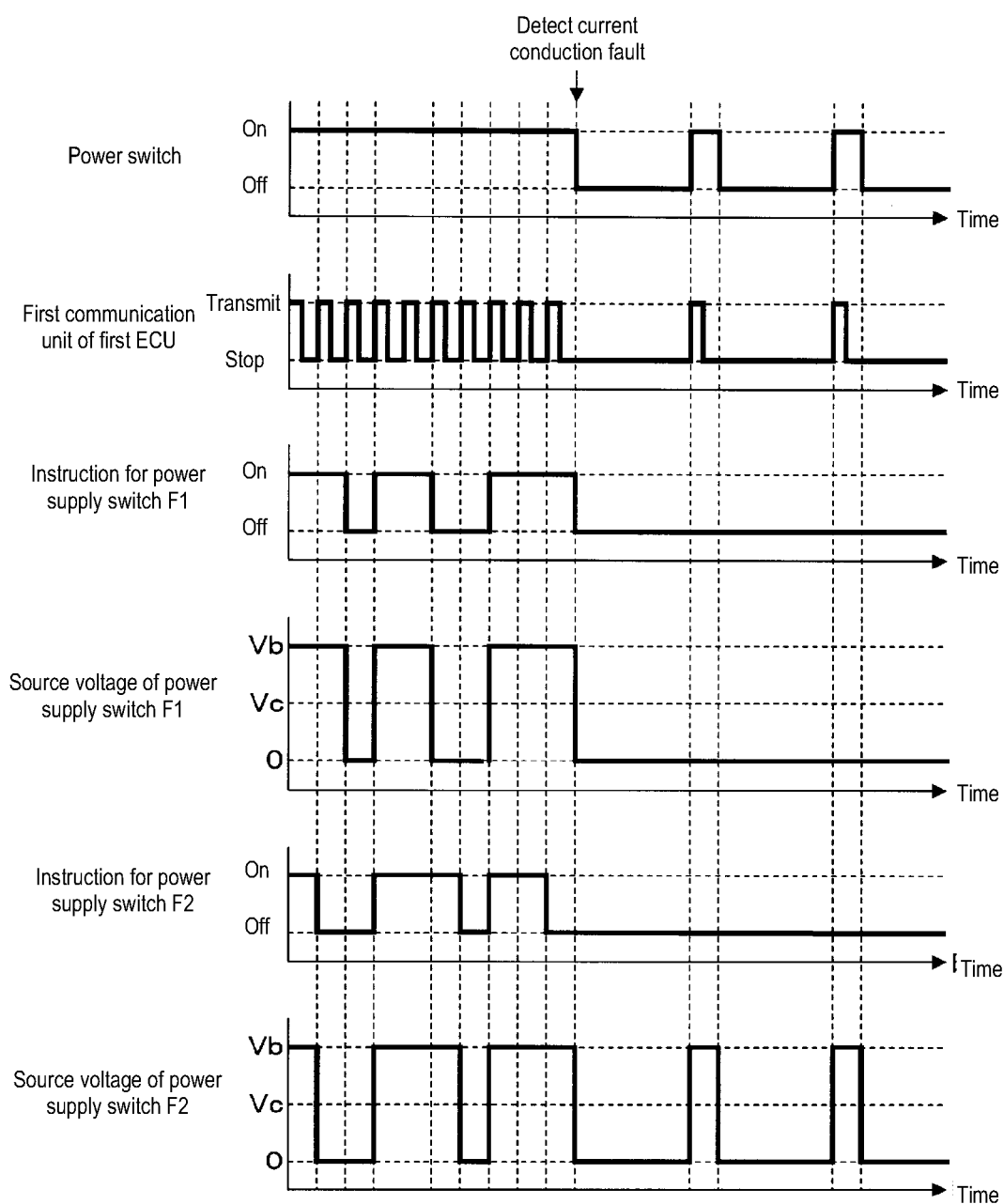
FIG. 17 is another timing chart for describing the operations of the first ECU and the second ECU.

FIG. 17 is another timing chart for describing the operations of the first ECU 11 and the second ECU 12. FIG. 17 shows transitions of the state of the power switch 14, the state of the first communication unit 31 of the first ECU 11, the instruction for the power supply switch F1, the source voltage of the power supply switch F1, the instruction for the power supply switch F2, and the source voltage of the power supply switch F2. The horizontal axes of these transitions show time.

FIG. 17 shows operations in the case where a current conduction fault of the power supply switch F2 occurs. The operations before a current conduction fault of the power supply switch F1 or the power supply switch F2 is detected are as aforementioned. When the source voltage of the power supply switch F2 is greater than or equal to the fixed voltage $V_c$ despite an instruction being given to turn off the power supply switch F2, the first control unit 34 determines that a current conduction fault of the power supply switch F2 has occurred. A current conduction fault of the power supply switch F2 is thereby detected by the first control unit 34.

When the first control unit 34 of the first ECU 11 detects a current conduction fault of the power supply switch F2, the first control unit 34 instructs the drive circuit G2 to turn off the power supply switch F2. Furthermore, the switching circuit 41 of the second ECU 12 turns off the power switch 14. When a current conduction fault of the power supply switch F1 or the power supply switch F2 is detected, the first control unit 34 of the first ECU 11 ends the power supply control processing of the loads E1 and E2, and does not execute the power supply control processing of the loads E1 and E2, until the first MICOM 22 of the first ECU 11 starts up again. When a current conduction fault of the power supply switch F2 is detected, the first control unit 34 of the first ECU 11 stops execution of the transmission processing of the vehicle data D1.

After the first control unit 34 detects a current conduction fault, the switching circuit 41 of the second ECU 12 alternately turns the power switch 14 on and off repeatedly. The presence of the on-period, even in the case where a current conduction fault occurs, enables the first control unit 34 of the first ECU 11 to execute the transmission processing of the vehicle data D2. Accordingly, in the first ECU 11, when vehicle data D2 is input to the data input unit U2 during the on-period, the first communication unit 31 transmits the vehicle data D2.

In the second ECU 12, the second communication unit 52 transmits fault notification data indicating the power supply switch F2 to the first communication unit 31 of the first ECU 11, when the switching circuit 41 turns on the power switch 14. Thus, the first control unit 34 of the first ECU 11 ends the power supply control processing of the loads E1 and E2 before instructing to turn on the power supply switches F1 and F2. Furthermore, the first control unit 34 stops execution of the transmission processing of the vehicle data D1 before the first communication unit 31 transmits the vehicle data D1.

In the case where the first control unit 34 of the first ECU 11 detects a current conduction fault of the power supply switch F2, the on-period of the power switch 14 is short, and thus transmission of the vehicle data D1 is stopped and transmission of the vehicle data D2 is executed.

As described above, before a current conduction fault occurs in one of the two power supply switches F1 and F2, the first control unit 34 of the first ECU 11 executes the transmission processing of the vehicle data D1 and D2 (non-power supply control processing). If it is determined, for one of the two power supply switches F1 and F2, that a current conduction fault has occurred, the transmission processing of the vehicle data D1 and the vehicle data D2 that is executed by the first control unit 34 depends on which power supply switch has suffered the current conduction fault. Accordingly, the transmission processing of the vehicle data D1 and the vehicle data D2 that is executed depends on the length of the on-period of the power supply switch in which the current conduction fault occurs. The number of types of transmission processing that is executed during the on-period decreases as the length of the on-period decreases.

Modifications of Embodiment 2

In Embodiment 2, the number of types of non-power supply control processing is not limited to 2 and may be 3 or more. The number of types of non-power supply control processing that are executed by the first control unit 34 when a current conduction fault of the power supply switch F1 is detected differing from the number of types of non-power supply control processing that are executed by the first control unit 34 when a current conduction fault of the power supply switch F2 is detected is not an issue.

The number of types of non-power supply control processing that are executed when the first control unit 34 determines, for one of the two power supply switches F1 and F2, that a current conduction fault has occurred may be the same. The total of the on-period and the off-period when a current conduction fault of the power supply switch F1 occurs may differ from the total of the on-period and the off-period when a current conduction fault of the power supply switch F2 occurs. The length of the off-period may be fixed, regardless of which of the two power supply switches F1 and F2 has suffered the current conduction fault.

The number of power supply switches included in the first ECU 11 is not limited to 2 and may be 3 or more. In this case, the first control unit 34 determines, for each of the plurality of power supply switches, whether a current conduction fault has occurred. If the first control unit 34 determines, for one of the plurality of power supply switches, that a current conduction fault has occurred, the switching circuit 41 of the second ECU 12 alternately turns the power switch 14 on and off repeatedly. The length of the on-period differs depending on the power supply switch in which the current conduction fault occurs. The number of types of non-power supply control processing that are executed in the case where the first control unit 34 determines, for one of the plurality of power supply switches, that a current conduction fault has occurred may differ or may be the same.

Modifications of Embodiments 1 and 2

In Embodiments 1 and 2, the method for determining whether a current conduction fault of a power supply switch has occurred is not limited to a method that is based on the source voltage of the power supply switch. The output current that is being output from the source of the power supply switch may be detected. When a current is being output from the source of a power supply switch despite an instruction being given to turn off the power supply switch, the first control unit 34 of the first ECU 11 determines that a current conduction fault of the power supply switch has occurred. The non-power supply control processing that differs from power supply control is not limited to data transmission processing, and may, for example, be processing for performing determination.

The power switch 14 may be disposed within the second ECU 12. The number of third ECUs 13 that are connected to the communication bus B is not limited to 1 and may be 2 or more. In Embodiment 2, the third ECU 13 to which the vehicle data D1 is transmitted may differ from the third ECU 13 to which the vehicle data D2 is transmitted. The power supply switches F1 and F2 are not limited to N-channel FETs, and may be P-channel FETs, bipolar transistors, relay contacts and the like.

Embodiments 1 and 2 disclosed herein are considered in all respects to be illustrative and not restrictive. The scope of the disclosure is indicated by the claims rather than by the foregoing content, and all changes that come within the meaning and range of equivalency of the claims are intended to be embraced therein.

The invention claimed is:

1. A power supply control system comprising:
   a control device configured to control power supplied through a first switch, by turning the first switch on or off; and
   a switching device configured to turn on or off a second switch disposed upstream of the first switch on a current path of a current flowing through the first switch,
   wherein the control device includes a processing unit configured to receive power supply from a connection node between the first switch and the second switch and execute processing,
   the processing unit
      instructs to turn the first switch on or off while the second switch is on,
      executes non-power supply control processing different from processing relating to control of power supplied through the first switch, and
      determines whether a current conduction fault in which a current flows through the first switch despite an instruction being given to turn off the first switch has occurred, and
   the switching device alternately turns the second switch on and off repeatedly, after the processing unit determines that the current conduction fault has occurred.

2. The power supply control system according to claim 1, wherein the processing unit of the control device instructs data transmission in the non-power supply control processing.

3. The power supply control system according to claim 2, wherein, a length of an on-period during which the second switch is on and a length of an off-period during which the second switch is off are fixed, when the switching device is alternately turning the second switch on and off repeatedly, and
the on-period is shorter than the off-period.

4. The power supply control system according to claim 1, wherein, a length of an on-period during which the second switch is on and a length of an off-period during which the second switch is off are fixed, when the switching device is alternately turning the second switch on and off repeatedly, and
the on-period is shorter than the off-period.

5. The power supply control system according to claim 4, wherein two or more of the first switch are provided,
a current flowing through the second switch is divided into a plurality of currents,
the plurality of currents respectively flow through the plurality of first switches,
the processing unit of the control device determines, for each of the plurality of first switches, whether the current conduction fault has occurred,
when the processing unit determines, for one of the plurality of first switches, that the current conduction fault has occurred, the switching device alternately turns the second switch on and off repeatedly, and
the length of the on-period differs depending on the first switch in which the current conduction fault occurs.

6. The power supply control system according to claim 5, wherein the processing unit
   executes a plurality of types of non-power supply control processing before the current conduction fault occurs in one of the plurality of first switches, and
   having determined, for one of the plurality of first switches, that the current conduction fault has occurred, executes non-power supply control processing that depends on the first switch in which the current conduction fault occurs, out of the plurality of types of non-power supply control processing.

7. A processing method in which a first computer and a second computer that receive power supply from a connection node between a first switch and a second switch disposed upstream of the first switch on a current path of a current flowing through the first switch, the first computer executing:
- a step of instructing to turn the first switch on or off while the second switch is on;
- a step of executing non-power supply control processing different from processing relating to control of power supplied through the first switch; and
- a step of determining whether a current conduction fault in which a current flows through the first switch despite an instruction being given to turn off the first switch has occurred,
- wherein the second computer executes a step of alternately instructing repeatedly to turn the second switch on and off, after the first computer determines that the current conduction fault has occurred.

* * * * *